United States Patent
Liang et al.

(10) Patent No.: US 11,303,395 B2
(45) Date of Patent: Apr. 12, 2022

(54) UPLINK CONTROL INFORMATION SENDING METHOD AND APPARATUS, AND TERMINAL

(71) Applicant: ZTE CORPORATION, Shenzhen (CN)

(72) Inventors: Chunli Liang, Shenzhen (CN); Shuqiang Xia, Shenzhen (CN); Jing Shi, Shenzhen (CN); Xianghui Han, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 318 days.

(21) Appl. No.: 16/338,439

(22) PCT Filed: Jul. 26, 2017

(86) PCT No.: PCT/CN2017/094519
§ 371 (c)(1),
(2) Date: Sep. 5, 2019

(87) PCT Pub. No.: WO2018/059098
PCT Pub. Date: Apr. 5, 2018

(65) Prior Publication Data
US 2019/0393994 A1    Dec. 26, 2019

(30) Foreign Application Priority Data
Sep. 30, 2016    (CN) .................. 201610874565.1

(51) Int. Cl.
*H04L 1/18* (2006.01)
*H04L 1/16* (2006.01)
(Continued)

(52) U.S. Cl.
CPC .......... *H04L 1/1854* (2013.01); *H04L 1/1678* (2013.01); *H04L 1/1812* (2013.01);
(Continued)

(58) Field of Classification Search
CPC ... H04L 1/1812; H04L 1/1678; H04L 1/1854; H04L 1/1861; H04L 1/1864; H04L 5/00;
(Continued)

(56) References Cited

U.S. PATENT DOCUMENTS

2013/0114474 A1     5/2013  Fu et al.
2013/0301490 A1*   11/2013  He .................... H04W 52/0209
                                                            370/280
(Continued)

FOREIGN PATENT DOCUMENTS

CN    101867406 A    10/2010
CN    103095432 A     5/2013
(Continued)

OTHER PUBLICATIONS

Lee et al., "UL Transmission Timing With Shortened Processing Time", Sep. 29, 2016, U.S. Appl. No. 62/401,839, Total pp. 35 (Year: 2016).*
(Continued)

*Primary Examiner* — Shah M Rahman
(74) *Attorney, Agent, or Firm* — Li & Cai Intellectual Property (USA) Office

(57) ABSTRACT

Disclosed are an uplink control information sending method and apparatus, and a terminal. The method comprises: with respect to a terminal supporting P minimum HARQ timings, determining a downlink subframe set S(n) corresponding to the P minimum HARQ timings, wherein S(n) is a union set of all sets $\Psi(n,K_i)$; and the terminal sending, on an uplink subframe n, the set S(n) or a HARQ-ACK corresponding to transmission data in the downlink subframe set $\Psi(n,K_i)$.

15 Claims, 5 Drawing Sheets

---

101 — WITH RESPECT TO A TERMINAL SUPPORTING P MINIMUM HYBRID AUTOMATIC REPEAT REQUEST (HARQ) TIMINGS, DETERMINING A DOWNLINK SUBFRAME SET S(N) CORRESPONDING TO THE P MINIMUM HARQ TIMINGS, WHEREIN S(N) IS A UNION SET OF ALL DOWNLINK SUBFRAME SETS Ψ(N,KI)

102 — THE TERMINAL SENDING, ON AN UPLINK SUBFRAME N, THE DOWNLINK SUBFRAME SET S(N) OR AN HARQ-ACK CORRESPONDING TO TRANSMISSION DATA IN THE DOWNLINK SUBFRAME SET Ψ(N,KI)

(51) Int. Cl.
*H04L 5/00* (2006.01)
*H04W 72/04* (2009.01)
*H04W 72/12* (2009.01)

(52) U.S. Cl.
CPC .......... *H04L 1/1861* (2013.01); *H04L 1/1864* (2013.01); *H04L 5/0055* (2013.01); *H04W 72/0406* (2013.01); *H04W 72/1284* (2013.01); *H04W 72/0446* (2013.01)

(58) Field of Classification Search
CPC ............ H04L 5/0055; H04W 72/0406; H04W 72/0446; H04W 72/1284
See application file for complete search history.

(56) References Cited

U.S. PATENT DOCUMENTS

| | | | |
|---|---|---|---|
| 2014/0219113 A1* | 8/2014 | Li | H04B 17/345 370/252 |
| 2014/0269453 A1* | 9/2014 | Papasakellariou | H04W 72/0413 370/280 |
| 2014/0286206 A1* | 9/2014 | Song | H04L 1/1861 370/280 |
| 2015/0146588 A1* | 5/2015 | Park | H04L 5/14 370/280 |
| 2015/0173102 A1* | 6/2015 | Ruiz Delgado | H04L 5/14 370/280 |
| 2015/0215079 A1* | 7/2015 | Park | H04L 1/1854 370/280 |
| 2015/0295681 A1 | 10/2015 | Liang et al. | |
| 2016/0014753 A1* | 1/2016 | Wu | H04W 74/0833 370/280 |
| 2016/0020891 A1* | 1/2016 | Jung | H04W 72/1278 370/280 |
| 2016/0204906 A1 | 7/2016 | Cheng et al. | |
| 2016/0234800 A1 | 8/2016 | Jung et al. | |
| 2016/0330010 A1* | 11/2016 | Qin | H04L 5/0055 |
| 2018/0014301 A1* | 1/2018 | Chen | H04L 1/1896 |
| 2018/0049046 A1* | 2/2018 | Lunttila | H04L 1/1854 |
| 2019/0081764 A1* | 3/2019 | Guan | H04L 5/0055 |
| 2019/0182011 A1* | 6/2019 | Li | H04L 1/1812 |
| 2019/0372721 A1* | 12/2019 | Lee | H04L 1/1864 |

FOREIGN PATENT DOCUMENTS

| | | |
|---|---|---|
| CN | 103209061 A | 7/2013 |
| CN | 103427962 A | 12/2013 |
| CN | 103516487 A | 1/2014 |
| CN | 103780361 A | 5/2014 |
| WO | 2015039410 A1 | 3/2015 |

OTHER PUBLICATIONS

3GPP, 3GPP TS 36.211 version 9.1.0 Release 9, Apr. 2010, 3GPP, ETSI, ETSI TS 136 211 V10.1.0 (Apr. 2011), pp. 10-11, Total pp. 2 (Year: 2010).*
Samsung, "R1-166696 FDD DL HARQ-ACK feedback procedure for latency reduction with subframe TTI", Aug. 2016, 3GPP TSG RAN WG1 Meeting #86, R1-166696, Total pp. 3 (Year: 2016).*
European Patent Office, Extended European Search Report dated Sep. 9, 2019 for EP17854552.1.
China Patent Office, First Office Action dated Feb. 3, 2020 for CN201610874565.1.
Qualcomm Incorporated, "Shortened Processing Time for Downlink 1ms TTI", R1-166307, issued on Aug. 26, 2016.
CATT, "HARQ and scheduling timing design for LTE processing timing reduction with 1ms TTI", 3GPP TSG RAN WG1 Meeting#86, Aug. 26, 2016.
Nokia et al., "Latency Reduction for FS2 with 1-ms TTI", R1-167016, issued on Aug. 26, 2016.
ZTE Corp, et al., "HARQ with shortened processing time for 1ms TTI", 3GPP TSG RAN WG1 Meeting#86, Aug. 12, 2016.
International Search Report for International Application No. PCT/CN2017/094519; Date of Completion: Sep. 28, 2017; dated Oct. 27, 2017; 2 Pages.

* cited by examiner

UPLINK CONTROL INFORMATION SENDING METHOD AND APPARATUS, AND TERMINAL

CROSS-REFERENCE TO RELATED APPLICATION

This application is the 371 application of PCT Application No. PCT/CN2017/094519, filed Jul. 26, 2017, which is based upon and claims priority to Chinese Patent Application No. 201610874565.1, filed Sep. 30, 2016, the entire contents of which are incorporated herein by reference.

TECHNICAL FIELD

The present application relates to, but is not limited to, the field of wireless communication technologies, and more particularly, to a method and an apparatus for sending uplink control information, and a terminal.

BACKGROUND

The rapid development of the mobile internet and the Internet of Things leads to the explosive growth of data traffic and the widespread rise of diversified and differentiated services. As a new generation of mobile communication technology, the $5^{th}$ Generation Mobile Communication Technology (5G) will support a higher rate, a huge amount of links, a ultra-low time delay, a higher reliability, 100 times higher energy efficiency and so on, so as to support new demand changes in comparison with the $4^{th}$ Generation of Mobile Communication Technology (4G). The ultra-low time delay, as a key indicator of 5G technology, directly affects the development of time delay-limited services such as Internet of Vehicles, industrial automation, remote control, smart grid, etc. At present, a series of standard researches on reducing 5G time delay are promoted gradually.

As an important research orientation to reduce the time delay at current, reducing the Transmission Time Interval (TTI) is intended to reduce 1 ms TTI at current to 0.5 ms or even 1 to 2 symbols, which reduces the minimum scheduling time in multiples, so as to be capable of reducing the single transmission time delay in multiples without changing a frame structure. Another research course to reduce the time delay is to further reduce a processing time under the 1 ms TTI. As a result, the timing of a Hybrid Automatic Repeat reQuest (HARQ) will change accordingly. For the 1 ms TTI, the minimum HARQ timing thereof shall satisfy the relationship of n+4, and the minimum HARQ timing is recorded as 4. For a downlink HARQ, a Hybrid Automatic Repeat reQuest-Acknowledgement (HARQ-ACK) corresponding to a Physical Downlink Shared Channel (PDSCH) transmitted by a base station on a subframe n may be transmitted on a subframe n+4 at the earliest. For Frequency Division Duplexing (FDD), a timing relationship between the PDSCH and the HARQ-ACK is n+4, while for Time Division Duplexing (TDD), the timing relationship between the PDSCH and the HARQ-ACK is n+k due to the limitation of different uplink and downlink configurations, wherein k>=4.

In view of the situation that the downlink HARQ timing for 1 ms TTI in the existing system is performed based on the premise that the minimum HARQ timing is 4, when the minimum HARQ timing is k and k is less than 4, the downlink HARQ timing in the system needs to be modified accordingly, and the method for transmitting the HARQ-ACK also needs to be changed.

In addition, for User Equipment (UE) that supports to reduce 1 ms TTI processing time delay, when the base station configures the UE to operate in a mode of reducing the 1 ms TTI processing time delay through a high-level signaling, within an action period of the high-level signaling, one task at current is assumed to support that the PDSCH and HARQ-ACK timing on certain subframes fall back to a mode that the minimum HARQ timing is 4. How to support the minimum HARQ timing to dynamically fall back to 4, and how to carry out HARQ-ACK feedback when the UE supports the minimum HARQ timing to dynamically fall back to 4 are problems that need to be solved urgently.

This section provides background information related to the present disclosure which is not necessarily prior art.

SUMMARY

The following is an overview of the subject detailed herein. This summary is not intended to limit the scope of protection of the claims.

The present disclosure provides a method and an apparatus for sending uplink control information, and a terminal to further reduce the time delay.

According to an aspect, the embodiments of the present disclosure provide a method for sending uplink control information, including: for a terminal supporting P minimum Hybrid Automatic Repeat reQuest (HARQ) timings, determining a downlink subframe set S(n) corresponding to the P minimum HARQ timings, wherein S(n) is a union set of all downlink subframe sets $\Psi(n,K_i)$, P is an integer greater than 1, n is an integer greater than or equal to 0, $K_i$ is an integer greater than 0, but less than or equal to 4, and i is an integer greater than or equal to 1, but less than or equal to P, and sening, by the terminal in an uplink subframe n, a HARQ-ACK corresponding to transmission data in the downlink subframe set S(n) or the downlink subframe set $\Psi(n,K_i)$.

According to another aspect, the embodiments of the present disclosure further provide an apparatus for sending uplink control information, including: a processing module configured to determine a downlink subframe set S(n) corresponding to P minimum HARQ timings, wherein S(n) is a union set of all downlink subframe sets $\Psi(n,K_i)$, P is an integer greater than 1, n is an integer greater than or equal to 0, $K_i$ is an integer greater than 0, but less than or equal to 4, and i is an integer greater than or equal to 1, but less than or equal to P; and a sending module configured to transmit, by the terminal in an uplink subframe n, a HARQ-ACK corresponding to transmission data in the downlink subframe set S(n) or the downlink subframe set $\Psi(n,K_i)$.

According to one another aspect, the embodiments of the present disclosure provide a terminal, including a processor for data processing, a memory for data storage, and a data transceiver for data transmitting and receiving, wherein the memory is stored with a computer-executable instruction for executing the method for sending uplink control information according to the above aspects.

According to yet another aspect, the embodiments of the present disclosure further provide a computer readable storage medium storing a computer-executable instruction which, when being executed by a processor, implements the above-mentioned method for sending uplink control information.

The embodiments of the present disclosure can perform HARQ-ACK feedback for a plurality of minimum HARQ timings, thus implementing the effect of reducing the time delay.

Other aspects will become apparent upon reading and understanding the drawings and detailed description.

This section provides a summary of various implementations or examples of the technology described in the disclosure, and is not a comprehensive disclosure of the full scope or all features of the disclosed technology.

DETAILED DESCRIPTION

The application will be further described in detail hereinafter with reference to the accompanying drawings and embodiments. It should be understood that the embodiments described herein are merely illustrative of the application and are not intended to limit the application.

Figure 1:
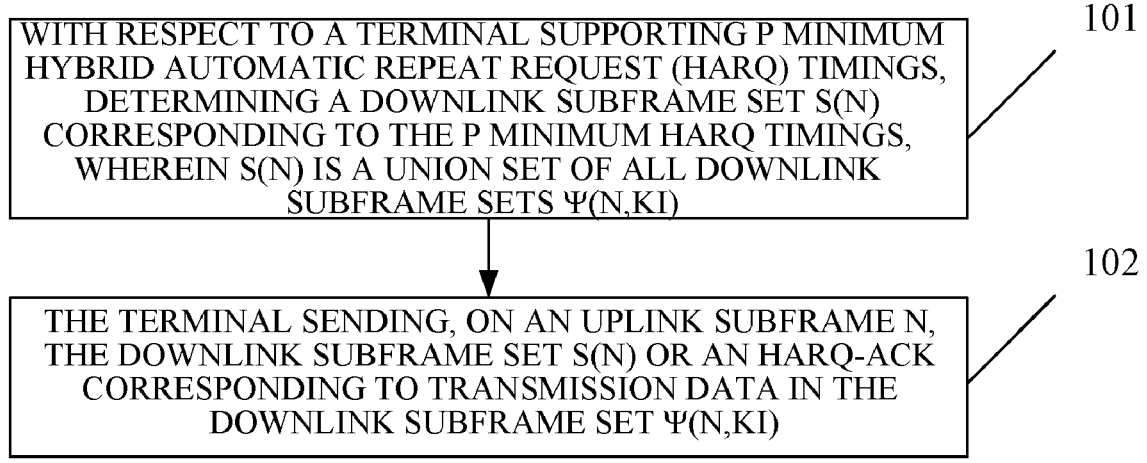
FIG. 1 is a flow chart of a method for sending uplink control information according to an embodiment of the present disclosure.

As shown in FIG. 1, a method for sending uplink control information according to an embodiment of the present disclosure includes the following steps.

In step 101: for a terminal supporting P minimum Hybrid Automatic Repeat reQuest (HARQ) timings, a downlink subframe set S(n) corresponding to the P minimum HARQ timings is determined, wherein S(n) is a union set of all downlink subframe sets $\Psi(n,K_i)$, P is an integer greater than 1, n is an integer greater than or equal to 0, $K_i$ is an integer greater than 0, but less than or equal to 4, and i is an integer greater than or equal to 1, but less than or equal to P.

In step 102: the terminal transmits in an uplink subframe n, a Hybrid Automatic Repeat reQuest Acknowledgement (HARQ-ACK) corresponding to transmission data in the downlink subframe set S(n) or the downlink subframe set $\Psi(n,K_i)$.

Through the embodiment of the present disclosure, HARQ-ACK feedback can be performed for a plurality of minimum HARQ timings, thus implementing the effect of reducing the time delay.

In an implementation manner, before the step 101, the method further includes:

when the terminal performs HARQ-ACK feedback in the uplink subframe n, determining the downlink subframe set $\Psi(n,K_i)$ requiring HARQ-ACK feedback corresponding to each minimum HARQ timing in the uplink subframe n, wherein the P minimum HARQ timings are $K_1, K_2, \ldots, K_P$ respectively, $K_1 > K_2 > \ldots > K_P$; and P>1, and i=1, 2, ..., P.

In an implementation manner, the terminal determines the minimum HARQ timing used by the subframe according to the downlink control information.

In an implementation manner, the method further includes:

when the minimum HARQ timing of the downlink subframe received by the terminal is $K_x$, while the minimum HARQ timing of the last downlink subframe received previously is $K_y$, and $K_x > K_y$, performing, by the terminal, a fallback operation of the minimum HARQ timing in the downlink subframe; wherein the downlink subframe has different HARQ timings when the minimum HARQ timings are $K_x$ and $K_y$, $K_x, K_y \in \{K_1, K_2, \ldots, K_P\}$.

In an implementation manner, for a Time Division Duplexing (TDD) system, the downlink subframe set $\Psi(n, K_i)$ is determined according to at least one of the minimum HARQ timing, uplink and downlink configurations, and downlink-reference uplink and downlink configurations.

In an implementation manner, elements in the downlink subframe set S(n) are sorted according to an order of $\Psi(n,K_1), \Psi(n,K_2), \ldots, \Psi(n,K_P)$; and for the same elements contained in two or more than two sets $\Psi(n,K_1)$, $\Psi(n,K_2), \ldots, \Psi(n,K_P)$, the set S(n) only contains the element that appears for the first time.

In an implementation manner, the transmitting, by the terminal in the uplink subframe n, the HARQ-ACK of the transmission data in the downlink subframe set S(n) or the downlink subframe set Ψ(n,K$_i$) includes:

determining an order of a used channel selection table, or a HARQ-ACK codebook size of each serving cell, and a HARQ-ACK when the HARQ-ACK is transmitted in a Physical Uplink Control Channel PUCCH.

In an implementation manner, a value of M in the channel selection table is determined according to the downlink subframe set S(n) or the downlink subframe set Ψ(n,K$_i$) when the terminal is configured as HARQ-ACK multiplexing or PUCCH format 1b joint channel selection; a HARQ-ACK(i) in the channel selection table corresponding to a downlink subframe n−k$_i$, wherein k$_i$∈S(n) is an element in the set S(n); and when the terminal is configured as a PUCCH format 3, a single codeword stream transmission mode or a double codeword stream transmission mode is configured and spatial binding is enabled, the HARQ-ACK codebook size L of each serving cell is equal to M; and when the double codeword stream transmission mode is configured and the spatial binding is not enabled, the HARQ-ACK codebook size L of each serving cell is equal to 2M.

In an implementation manner, an element a$_i$ or a$_{2i}$,a$_{2i+1}$ in an HARQ-ACK bit sequence of each serving cell transmitted in the PUCCH format 3 is corresponding to a subframe n−k$_i$ or HARQ-ACK of two codeword streams of the subframe n−k$_i$; or, the subframe n−k$_i$ or the HARQ-ACK of two codeword streams of the subframe n−k$_i$ is corresponding to a bit sequence element a$_{DAI(ki)-1}$ or a$_{2DAI(ki)-2}$,a$_{2DAI(ki)-1}$, wherein DAI(k$_i$) is a Downlink Assignment Indicator (DAI (value in Downlink Control Information (DCI) transmitted by the subframe n−k$_i$.

In an implementation manner, when the HARQ-ACK bit sequence is sorted based on DAI, a DAI value thereof is determined according to a HARQ-ACK timing of a currently scheduled subframe when performing downlink scheduling, and subframe accumulation is performed on DAI values of downlink subframes performing HARQ-ACK feedback in the same uplink subframe.

In an implementation manner, the transmitting, by the terminal in the uplink subframe n, the HARQ-ACK of the transmission data in the downlink subframe set Ψ(n,K$_i$) includes.

for a FDD system, when the terminal receives scheduling with a minimum timing K$_a$ in a downlink subframe m, not transmitting, by the terminal, a HARQ-ACK corresponding to the scheduling when the terminal receives scheduling with a minimum HARQ timing K$_b$ in (K$_a$−K$_b$) subframes after the downlink subframe m, wherein K$_b$<K$_a$, K$_a$,K$_b$∈{K$_1$, K$_2$, . . . , K$_P$}, and transmitting a HARQ-ACK of the downlink subframe m in the uplink subframe n, wherein m is an integer different from n, and greater than or equal to 0.

Detailed description will be given hereinafter through the embodiments.

First Embodiment

Figure 2:
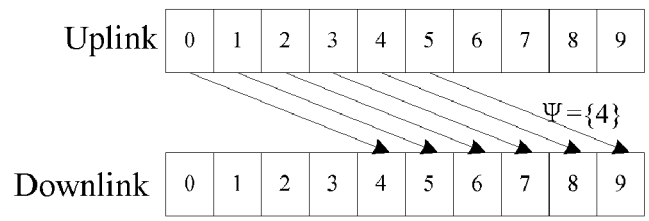
FIG. 2 is a schematic diagram of a timing relationship between a PDSCH and a HARQ-ACK of an LTE FDD system.

FIG. 2 shows a timing relationship of a downlink HARQ of an FDD system in LTE. As shown in FIG. 2, for a PDSCH transmitted in a downlink subframe 0, a corresponding HARQ-ACK of the PDSCH is fed back by a terminal in an uplink subframe 4. That is, for a PDSCH transmitted in a downlink subframe n, a corresponding HARQ-ACK of the PDSCH is fed back by the terminal in a subframe n+4. Or, a HARQ-ACK of the PDSCH transmitted in a downlink subframe n−4 is fed back by the terminal in the uplink subframe n, and the timing relationship above is called a timing relationship between the PDSCH and the HARQ-ACK.

Figure 3:
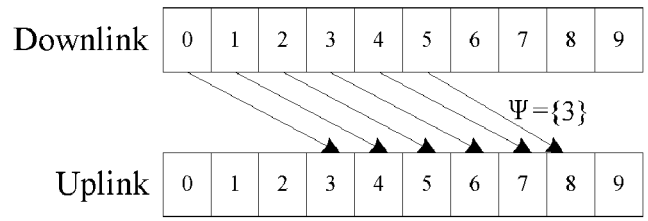
FIG. 3 is a schematic diagram of a timing relationship between a PDSCH and a HARQ-ACK of an FDD system when 1 ms processing time delay is reduced to 3 ms in an embodiment of the present disclosure.

When the minimum HARQ timing is reduced as 3 ms, for the FDD system, the timing relationship between the PDSCH and the HARQ-ACK thereof is easy to be determined by modifying the original n−4 as n−3. FIG. 3 shows a schematic diagram of the timing relationship between the PDSCH and the HARQ-ACK when a corresponding minimum processing time is 3 ms.

The terminal determines the HARQ-ACK fed back according to the timing relationship between the PDSCH and the HARQ-ACK.

Second Embodiment

For a TDD system, the relationship between the PDSCH and the HARQ-ACK is different from that of the FDD system due to the limitations of different uplink and downlink configurations, and different distributions of uplink and downlink subframes. The current protocols define a downlink subframe set for transmitting a PDSCH corresponding to a HARQ-ACK fed back by each uplink subframe in each uplink and downlink configuration for the TDD system, which is as shown in Table 1, wherein meanings of elements in downlink subframe sets in the table indicate the interval (with a unit of TTI, i.e., subframe) between the uplink subframe of the transmitted HARQ-ACK and the downlink subframe of the corresponding PDSCH.

TABLE 1 downlink subframe set Ψ(K$_i$ = 4) corresponding to HARQ-ACK fed back by uplink subframes in TDD system

| Uplink and downlink configuration | Subframe n (K$_i$ = 4) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 1-continued downlink subframe set $\Psi(K_i = 4)$ corresponding to
HARQ-ACK fed back by uplink subframes in TDD system

| Uplink and downlink configuration | Subframe n ($K_i = 4$) | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 4:
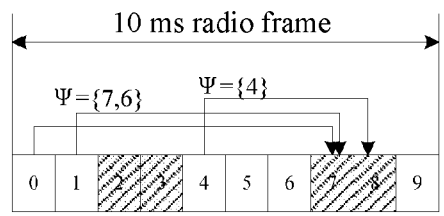
FIG. 4 is a schematic diagram of the timing relationship between the PDSCH and the HARQ-ACK under an uplink and downlink configuration 1 in the LTE TDD system.

FIG. 4 shows a schematic diagram of the timing relationship between the PDSCH and the HARQ-ACK obtained according to Table 1 under an uplink and downlink configuration 1. In an LTE TDD system, the minimum HARQ timing K is 4. For a subframe n=7, a downlink subframe set $\Psi(n,K)=\{7,6\}$ requiring HARQ-ACK feedback corresponding to the uplink subframe n can be determined from Table 1, that is, the HARQ-ACK transmitted thereon is corresponding to the HARQ-ACK of the PDSCH transmitted in a subframe n−7 and a subframe n−6, i.e., a subframe 0 and a subframe 1 of the current radio frame.

Similarly, for a subframe 8, a downlink subframe set $\Psi(n,K)=\{4\}$ requiring HARQ-ACK feedback corresponding to the uplink subframe n can be determined from Table 1, that is, the HARQ-ACK transmitted thereon is corresponding to the HARQ-ACK of the PDSCH transmitted in a subframe n−4, i.e., a subframe 4 of the current radio frame.

As can be seen from Table 1, the corresponding downlink subframe sets $\Psi(n,K)$ requiring HARQ-ACK feedback in the subframe n are different under different uplink and downlink configurations.

The downlink subframe set corresponding to the HARQ-ACK fed back by the uplink subframe shown in Table 1 is used for determining a channel selection mapping table or a HARQ-ACK codebook size used when the terminal transmits the HARQ-ACK in the PUCCH. If a HARQ-ACK feedback mode of the terminal is configured as HARQ-ACK multiplexing, and the uplink and downlink configuration is the configuration 2, when the terminal transmits the HARQ-ACK in the PUCCH, a channel selection mapping table (M=4) will be used in a subframe 2/7 If the HARQ-ACK feedback mode of the terminal is configured as PUCCH format 3, and the uplink and downlink configuration is the configuration 2, the terminal is configured to support a transmission mode of double codeword stream and spatial binding is not enabled, then the HARQ-ACK codebook size is 4*2=8 in the subframe 2/7 when the terminal transmits the HARQ-ACK in the PUCCH, wherein 4 is corresponding to a number of elements in a downlink subframe set corresponding to the subframe 2/7 in Table 2, and 2 is corresponding to a number of HARQ-ACK bits that need to be fed back for each subframe when the terminal is configured to support the transmission mode of the double codeword stream.

The foregoing embodiment is directed to a scenario of one serving cell, and the method may be extended to a scenario in which the serving cells are aggregated. The processing for each serving cell is substantially the same as that for the single serving cell described in the foregoing embodiment. For aggregating TDD serving cells with different uplink and downlink configurations, or the serving cells supporting Enhanced Interference Management Traffic Adaptation (eIMTA), or the FDD-TDD aggregation, it is only needed to replace the above uplink and downlink configurations with the downlink-reference uplink and downlink configurations, which are related arts and will not be elaborated here.

Third Embodiment

For the TDD system, when the minimal processing time is reduced to 3 ms or 2 ms, the timing relationship between the PDSCH and the HARQ-ACK of the FDD system needs to be redesigned, and the following two design principles are taken into consideration:

HARQ-ACK timing design principle 1: the design principle of priority to homogeneous distribution of HARQ-ACKs transmitted in each uplink subframe; and HARQ-ACK timing design principle 2: the design principle of priority to minimum HARQ-ACK feedback time delay time.

HARQ-ACK timing design principle 3: For different uplink and downlink configurations, the HARQ-ACK timing design principle 1 or 2 is used.

Table 2 and Table 3 are the downlink subframe sets corresponding to the HARQ-ACK transmitted by the uplink subframe obtained based on the HARQ-ACK timing design principle 1, which respectively correspond to $K_i=3$ and $K_i=2$. For the ordering of the subframes in each downlink subframe set, when the size of the downlink subframe set (the number of elements in the subframe set) is less than or equal to 4, the sorting of the same subframe in the subframe set under two timing relationships that the 1 ms time delay is reduced ($K_i=4$) and the 1 ms time delay is not reduced ($K_i=2/3$) keeps the same as that of the timing relationship that the 1 ms time delay is not reduced. For example, for the configuration 1, for subframe n=2, when the minimum HARQ timing $K_i=4$, a corresponding downlink subframe set $\Psi(n,4)=\{12,7,4,6\}$, then when the minimum HARQ is $K_i=3$, a corresponding downlink subframe set $\Psi(n,3)=\{3,7,4,6\}$, and the sorting of the elements $\{7,4,6\}$ in the set $\Psi(n,4)$ is the same as the sorting thereof in the set $\Psi(n, 4)$.

TABLE 2 downlink subframe set $\Psi(K_i, \text{principal } 1)$ corresponding
to HARQ-ACK fed back by uplink subframes in TDD system

| Uplink and downlink configuration | Subframe n ($K_i = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 3, 7, 4, 6 | — | — | — | — | 3, 7, 4, 6 | — | — |
| 3 | — | — | 7, 6, 5 | 4, 5 | 3, 4 | — | — | — | — | — |
| 4 | — | — | 6, 8, 7, 11 | 6, 5, 4, 3 | — | — | — | — | — | — |
| 5 | — | — | 3, 12, 9, 8, 7, 5, 4, 11, 6 | — | — | — | — | — | — | — |
| 6 | — | — | 6 | 4 | 4 | — | — | 6 | 3 | — |

TABLE 3 downlink subframe set $\Psi(K_i = 2, \text{principal } 1)$ corresponding
to HARQ-ACK fed back by uplink subframes in TDD system

| Uplink and downlink configuration | Subframe n ($K_i = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |
| 2 | — | — | 3, 2, 4, 6 | — | — | — | — | 3, 2, 4, 6 | — | — |
| 3 | — | — | 7, 6, 5 | 4, 5 | 3, 4 | — | — | — | — | — |
| 4 | — | — | 5, 8, 7, 6 | 3, 5, 4, 2 | — | — | — | — | — | — |
| 5 | — | — | 3, 2, 9, 8, 7, 5, 4, 11, 6 | — | — | — | — | — | — | — |
| 6 | — | — | 3 | 3 | 3 | — | — | 2 | 2 | — |

Table 4 and Table 5 are downlink subframe sets corresponding to HARQ-ACK transmitted by uplink subframes obtained on the basis of HARQ-ACK timing design principle 2.

TABLE 4 downlink subframe set $\Psi(K_i = 3, \text{principal } 2)$ corresponding
to HARQ-ACK fed back by uplink subframes in TDD system

| Uplink and downlink configuration | Subframe n ($K_i = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 3, 7, 4, 6 | — | — | — | — | 3, 7, 4, 6 | — | — |
| 3 | — | — | 7, 6, 5, 4, 3 | 3 | 3 | — | — | — | — | — |
| 4 | — | — | 8, 7, 6, 5, 4, 3, 11 | 3 | — | — | — | — | — | — |
| 5 | — | — | 3, 12, 9, 8, 7, 5, 4, 11, 6 | — | — | — | — | — | — | — |
| 6 | — | — | 6, 3 | 3 | 3 | — | — | 3 | — | — |

TABLE 5 downlink subframe set $\Psi(K_i = 2, \text{principal } 2)$ corresponding
to HARQ-ACK fed back by uplink subframes in TDD system

| Uplink and downlink configuration | Subframe n ($K_i = 4$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |
| 2 | — | — | 3, 2, 4, 6 | — | — | — | — | 3, 2, 4, 6 | — | — |
| 3 | — | — | 7, 6, 5, 4, 3, 2 | 2 | — | — | — | — | — | — |
| 4 | — | — | 8, 7, 6, 5, 4, 3, 2 | 2 | — | — | — | — | — | — |
| 5 | — | — | 3, 2, 9, 8, 7, 5, 4, 11, 6 | — | — | — | — | — | — | — |
| 6 | — | — | 3, 2 | 2 | — | — | — | 2 | 2 | — |

For table 2 and table 4, the differences lie in the uplink and downlink configurations 3, 4 and 6. For example, as to the configuration 3, it can be seen from Table 2 that the numbers of downlink subframes corresponding to the HARQ-ACKs transmitted in uplink subframes 2, 3, 4 are respectively 3, 2, 2, while in Table 4, the numbers of downlink subframes are 5,1,1. Therefore, the HARQ-ACK transmitted in each uplink subframe in Table 2 is relatively uniform than that in Table 4. The similar principle is also applicable for the configuration 4. Therefore, from the perspective of approximate detection performances of the HARQ-ACKs in the uplink subframe, the design principle based on the uniform distribution of HARQ-ACKs is better. However, from the perspective of reducing the time delay, the design of Table 4 is better than the design of Table 2. Table 6 shows the average time delay of a HARQ-ACK feedback when the HARQ-ACK timing design principle 1 (corresponding to the principle 1 in the Table) and a HARQ-ACK timing design principle 2 (corresponding to the principle 2 in the Table) have different minimum processing time delays ($K_i$=2/3). The data in brackets in columns 3 to 6 in the Table represent the percentage of reduction relative to the time delay $K_i$=4.

TABLE 6 average time delay comparison of HARQ-ACK feedback

| Uplink and downlink configuration | Average time delay of HARQ-ACK feedback (ms) | | | | |
|---|---|---|---|---|---|
| | $K_i = 4$ | $K_i = 2$ | | $K_i = 3$ | |
| | | Principle 1 | Principle 2 | Principle 1 | Principle 2 |
| 0 | 5 | 2 (60%) | 2 (60%) | 3 (40%) | 3 (40%) |
| 1 | 5.67 | 2.3 (58.91%) | 2.3 (58.91%) | 4 (29.45%) | 4 (29.45%) |
| 2 | 6.25 | 3.75 (40%) | 3.75 (40%) | 5 (20%) | 5 (20%) |
| 3 | 6.28 | 4.86 (22.61%) | 4.14 (34.08%) | 4.86 (22.61%) | 4.4 (29.94%) |
| 4 | 7.5 | 5 (33.33%) | 4.6 (38.67%) | 6.3 (16%) | 5.9 (21.33%) |
| 5 | 8.3 | 6.1 (26.51%) | 6.1 (26.51%) | 7.2 (13.25%) | 7.2 (13.25%) |
| 6 | 6.6 | 2.6 (60.61%) | 2.2 (66.67%) | 4.6 (30.30%) | 3.6 (45.45%) |

As can be seen from Table 6, for uplink and downlink configurations 3 and 4, when the minimum processing time delay is reduced to 3 ms ($K_i$=3), the difference of reduction between the two design principles for the average time delays of HARQ-ACK feedback is not very large, but for configuration 6, the difference is relatively large. Therefore, different HARQ-ACK timing design principles can be considered for different uplink and downlink configurations. When the difference of reduction in the time delay of HARQ-ACK feedback brought by the two design principles is little, the principle of priority to homogeneous HARQ-ACK is adopted, whereas the principle of priority to the minimum HARQ-ACK time delay is adopted. For $K_i$=3, the HARQ-ACK timing design principle 1 is adopted for the configurations 3 and 4, while the HARQ-ACK timing design principle 2 is adopted for the configuration 6, thus obtaining the results shown in Table 7.

TABLE 7 downlink subframe set $\Psi(K_i$, principal 3) corresponding to HARQ-ACK fed back by uplink subframes in TDD system

| Uplink and downlink configuration | Subframe n ($K_i = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 3, 7, 4, 6 | — | — | — | — | 3, 7, 4, 6 | — | — |
| 3 | — | — | 7, 6, 5 | 4, 5 | 3, 4 | — | — | — | — | — |
| 4 | — | — | 6, 8, 7, 11 | 6, 5, 4, 3 | — | — | — | — | — | — |
| 5 | — | — | 3, 12, 9, 8, 7, 5, 4, 11, 6 | — | — | — | — | — | — | — |
| 6 | — | — | 6, 3 | 3 | 3 | — | — | — | 3 | — |

The above downlink subframe set corresponding to the HARQ-ACK fed back by the uplink subframe in the TDD system is the basis for determining the channel selection table or the HARQ-ACK codebook size used by the HARQ-ACK feedback when the HARQ-ACK is transmitted in a Physical Uplink Control CHannel (PUCCH). When the terminal is configured to operate in a mode of reducing the 1 ms processing time delay ($K_i$=2/3), the terminal determines the channel selection table or HARQ-ACK codebook size used for HARQ-ACK feedback according to the table. For example, when the terminal is configured to operate in a mode of reducing the 1 ms processing time delay to 3 ms ($K_i$=3), the terminal determines the channel selection table or the HARQ-ACK codebook size used when the HARQ-ACK is transmitted in the PUCCH according to one of the above-mentioned Tables 2, 4 or 7.

Further, the above-mentioned method of feeding back HARQ-ACK by the terminal is applicable to a scenario where a base station configures the terminal to operate under the mode of reducing the 1 ms processing time delay ($K_i$=2/3) through a high-level signaling, and the terminal does not expect to receive downlink control information instructing the terminal to fall back to the mode of not reducing the 1 ms processing time delay ($K_i$=4) within a configuration period of the high-level signaling, that is, the terminal at this time only supports one minimum HARQ timing mode when operating within a certain time range.

Fourth Embodiment

When the base station configures the terminal to operate in the mode of reducing the 1 ms processing time delay ($K_i$=2/3) through a high-level signaling, and the terminal allows receiving downlink control information indicating that the terminal falls back to the mode of not reducing the 1 ms processing time delay ($K_i$=4) within a configuration period of the high-level signaling, the terminal supports more than one minimum HARQ timings.

In order to explain the issues, the method according to the embodiments of the present disclosure is explained in detail by taking the terminal in the TDD system supporting two minimum HARQ timings as an example in the embodiment.

It is supposed that the minimum HARQ timing corresponding to the scenario where the terminal adopts the mode of not reducing the 1 ms processing time delay is $K_1$, while the minimum HARQ timing corresponding to the scenario where the terminal adopts the mode of reducing the 1 ms processing time delay is $K_2$. It is assumed that $K_1$=4, and $K_2$=3 here. The minimum HARQ timing being $K_1$ or $K_2$ here means that the terminal can transmit, in a subframe $n+K_1$ or $n+K_2$, a HARQ-ACK corresponding to a PDSCH transmitted by the base station in a subframe n at the earliest, or, a HARQ-ACK transmitted by the terminal in the subframe n is corresponding to a HARQ-ACK of a PDSCH transmitted by the base station in subframes $n-K_1$, $n-K_2$ or before the subframes $n-K_1$, $n-K_2$.

For the minimum HARQ timing $K_i$, an uplink subframe n is corresponding to a downlink subframe set $\Psi(n,K_1)$ requiring HARQ-ACK feedback, and for the minimum HARQ timing $K_2$, the uplink subframe n is corresponding to a downlink subframe set $\Psi(n,K_2)$ requiring HARQ-ACK feedback, wherein $\Psi(n,K))$ is determined according to Table 1 of the above embodiments, and $\Psi(n,K_2)$ can be determined according to one of the Tables 2, 4 and 7 of the above embodiments.

All the downlink subframe sets corresponding to the above two minimum HARQ timing are defined as S(n), wherein S(n) is a union set of $\Psi(n,K_1)$ and $\Psi(n,K_2)$, and the terminal transmits a HARQ-ACK of transmission data of the downlink subframe set S(n) in the uplink subframe n.

Elements in the downlink subframe set S(n) are sorted according to $\Psi(n,K_i)$ and $\Psi(n,K_2)$. For the same elements contained in the sets $\Psi(n,K_1)$ and $\Psi(n,K_2)$, only the element that appears for the first time is contained in the set S(n). According to the method, the downlink subframe set S(n) shown in Tables 8 to 10 is obtained.

The following further illustrates how the downlink set S(n) is determined by taking the uplink and downlink configuration 1 as an example.

For the minimum HARQ timing $K_1$, there is $\psi(n,K_1)$={7, 6} for an uplink subframe n=2/7 (2 or 7) according to the Table 1 in the first embodiment, while for the minimum HARQ timing $K_2$, there is $\psi(n,K_2)$={3,6} for the uplink subframe n=2/7 according to the Table 2 in the second embodiment; therefore, the downlink subframe set S(n)=$\Psi(n,K_1) \cup \Psi(n,K_1)$={7,6}∪{3,6}={7,6,3}. The set $\Psi(n,K_1)$ and the set $\Psi(n,K_2)$ both contain the element {6}; then, the S(n) only needs to contain the element {6} in $\Psi(n,K_1)$.

For an uplink subframe n=3/8, there is $\Psi(n,K_1)$={4} according to the Table 1 in the above embodiment, while for the minimum HARQ timing $K_2$, there is $\Psi(n,K_2)$={3} for an uplink subframe 3=2/8 according to the Table 2 in the above embodiment; therefore, the downlink subframe set S(n)=$\Psi(n,K_1) \cup \Psi(n,K_2)$={4}∪{3}={4,3}.

For the uplink and downlink configuration 2, for the minimum HARQ timing $K_1$, there is $\Psi(n,K_1)$={8,7,4,6} for the uplink subframe n=2/7 according to the Table 1 in the above embodiment, while for the minimum HARQ timing $K_2$, there is $\Psi(n,K_2)$={3,7,4,6} for the uplink subframe n=2/7 according to the Table 2 in the above embodiment; therefore, the downlink subframe set S(n)=$\Psi(n,K_1) \cup \Psi(n, K_2)$={8,7,4,6}∪{3,7,4,6}={8,7,4,6,3}. {7,4,6} are the same elements in $\Psi(n,K_1)$ and $\Psi(n,K_2)$, and thus such elements in the set $\Psi(n,K_2)$ in the latter order are no longer contained in the downlink subframe set S(n).

For other uplink and downlink configurations, the downlink subframe set S(n) can be determined in the same way, which will not be elaborated here.

TABLE 8 downlink subframe set $\Psi(K_1 = 4, K_2 = 3$, principal 1) corresponding to HARQ-ACK fed back by uplink subframes in TDD system

| Uplink and downlink configuration | Subframe n ($K_1$ = 4, $K_2$ = 3) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 4, 3 | — | — | 6 | 3 | 4, 3 |
| 1 | — | — | 7, 6, 3 | 4, 3 | — | — | — | 7, 6, 3 | 4, 3 | — |
| 2 | — | — | 8, 7, 4, 6, 3 | — | — | — | — | 8, 7, 4, 6, 3 | — | — |

TABLE 8-continued downlink subframe set $\Psi(K_1 = 4, K_2 = 3,$ principal 1) corresponding to HARQ-ACK fed back by uplink subframes in TDD system

| Uplink and downlink configuration | Subframe n ($K_1 = 4, K_2 = 3$) | | | | | | | | | |
|---|---|---|---|---|---|---|---|---|---|---|
| | 0 | 1 | 2 | 3 | 4 | 5 | 6 | 7 | 8 | 9 |
| 3 | — | — | 7, 6, 11, 5 | 6, 5, 4 | 5, 4, 3 | — | — | — | — | — |
| 4 | — | — | 12, 8, 7, 11, 6 | 7, 6, 5, 4, 3 | — | — | — | — | — | — |
| 5 | — | — | 13, 12, 9, 8, 7, 5, 4, 11, 6, 3, | — | — | — | — | — | — | — |
| 6 | — | — | 7, 6 | 7, 4 | 5, 4 | — | — | 7, 6 | 7, 3 | — |

TABLE 9 downlink subframe set $\Psi(K_1 = 4, K_2 = 3,$ principal 2) corresponding to HARQ-ACK fed back by uplink subframes in TDD system

| Uplink and downlink configuration | Subframe n ($K_1 = 4, K_2 = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 4, 3 | — | — | 6 | 3 | 4, 3 |
| 1 | — | — | 7, 6, 3 | 4, 3 | — | — | — | 7, 6, 3 | 4, 3 | — |
| 2 | — | — | 8, 7, 4, 6, 3 | — | — | — | — | 8, 7, 4, 6, 3 | — | — |
| 3 | — | — | 7, 6, 11, 5, 4, 3 | 6, 5, 3 | 5, 4, 3 | — | — | — | — | — |
| 4 | — | — | 12, 8, 7, 11, 6, 5, 4, 3, | 7, 6, 5, 4, 3 | — | — | — | — | — | — |
| 5 | — | — | 13, 12, 9, 8, 7, 5, 4, 11, 6, 3, | — | — | — | — | — | — | — |
| 6 | — | — | 7, 6, 3 | 7, 3 | 5, 3 | — | — | 7 | 7, 3 | — |

TABLE 10 downlink subframe set $\Psi(K_1 = 4, K_2 = 3,$ principal 3) corresponding to HARQ-ACK fed back by uplink subframes in TDD system

| Uplink and downlink configuration | Subframe n ($K_1 = 4, K_2 = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 4, 3 | — | — | 6 | 3 | 4, 3 |
| 1 | — | — | 7, 6, 3 | 4, 3 | — | — | — | 7, 6, 3 | 4, 3 | — |
| 2 | — | — | 8, 7, 4, 6, 3 | — | — | — | — | 8, 7, 4, 6, 3 | — | — |
| 3 | — | — | 7, 6, 11, 5, | 6, 5, 4 | 5, 4, 3 | — | — | — | — | — |
| 4 | — | — | 12, 8, 7, 11, 6 | 7, 6, 5, 4, 3 | — | — | — | — | — | — |
| 5 | — | — | 13, 12, 9, 8, 7, 5, 4, 11, 6, 3, | — | — | — | — | — | — | — |
| 6 | — | — | 7, 6, 3 | 7, 3 | 5, 3 | — | — | 7 | 7, 3 | — |

If the minimum HARQ timing corresponding to the reduction of the 1 ms processing time delay adopted by the terminal is $K_2$ and $K_2=2$, $\Psi(n,K_2)$ can be determined according to one of the Tables 3 and 5 in the above embodiments, and then the downlink subframe set S(n) shown in Tables 11 and 12 is obtained.

TABLE 11 downlink subframe set Ψ(K₁ = 4, K₂ = 2, principal 1) corresponding to HARQ-ACK fed back by uplink subframes in TDD system

| Uplink and downlink configuration | Subframe n ($K_1 = 4, K_2 = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 2 | 2 | 4 | — | — | 6, 2 | 2 | 4 |
| 1 | — | — | 7, 6, 3, 2 | 4, 2 | — | — | — | 7, 6, 3, 2 | 4, 2 | — |
| 2 | — | — | 8, 7, 4, 6, 3, 2 | — | — | — | — | 8, 7, 4, 6, 3, 2 | — | — |
| 3 | — | — | 7, 6, 11, 5 | 6, 5, 4 | 5, 4, 3 | — | — | — | — | — |
| 4 | — | — | 12, 8, 7, 11, , 6, 5, | 7, 6, 5, 4, 3, 2 | — | — | — | — | — | — |
| 5 | — | — | 13, 12, 9, 8, 7, 5, 4, 11, 6, 3, 2 | — | — | — | — | — | — | — |
| 6 | — | — | 7, 3 | 7, 3 | 5, 3 | — | — | 7, 2 | 7, 2 | — |

TABLE 12 downlink subframe set Ψ(K₁ = 4, K₂ = 2, principal 2) corresponding to HARQ-ACK fed back by uplink subframes in TDD system

| Uplink and downlink configuration | Subframe n ($K_1 = 4, K_2 = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 2 | 2 | 4 | — | — | 6, 2 | 2 | 4 |
| 1 | — | — | 7, 6, 3, 2 | 4, 2 | — | — | — | 7, 6, 3, 2 | 4, 2 | — |
| 2 | — | — | 8, 7, 4, 6, 3, 2 | — | — | — | — | 8, 7, 4, 6, 3, 2 | — | — |
| 3 | — | — | 7, 6, 11, 5, 4, 3, 2, | 6, 5, 2 | 5, 4 | — | — | — | — | — |
| 4 | — | — | 12, 8, 7, 11, 6, 5, 4, 3, 2, | 7, 6, 5, 4, 2 | — | — | — | — | — | — |
| 5 | — | — | 13, 12, 9, 8, 7, 5, 4, 11, 6, 3, 2 | — | — | — | — | — | — | — |
| 6 | — | — | 7, 3, 2 | 7, 2 | 5 | — | — | 7, 2 | 7, 2 | — |

Fifth Embodiment

For the User Equipment (UE) that supports to reduce 1 ms TTI processing time delay, when the base station configures the UE to operate in the mode of reducing the 1 ms TTI processing time delay ($K_i=2/3$) through a high-level signaling, within an action period of the high-level signaling, the PDSCH and the timing of the HARQ-ACK on certain subframes are supported to backspace to a mode that the minimum HARQ timing is $K_i=4$. The fallback operation of the embodiment means: switching from a relatively small minimum HARQ timing to a relatively large minimum HARQ timing.

when a minimum HARQ timing received by the terminal on a downlink subframe j is $K_x$, while the minimum HARQ timing of the last downlink subframe received previously is $K_y$, and $K_x > K_y$, then the terminal performs a fallback operation in the downlink subframe j, wherein $K_x, K_y \in \{K_1, K_2, \ldots, K_P\}$. The downlink subframe j backspaced by the terminal has the following characteristic: the subframe j has different HARQ timings when the minimum HARQ timings are $K_x$ and $K_y$.

The method according to the embodiments of the present disclosure is illustrated in detail by taking the terminal supporting two minimum HARQ timings as an example. It is supposed that the minimum HARQ timing corresponding to the scenario where the terminal adopts the mode of not reducing the 1 ms processing time delay is $K_1$, while the minimum HARQ timing corresponding to the scenario where the terminal adopts the mode of reducing the 1 ms processing time delay is $K_2$. It is set that $K_1=4$, and $K_2=3$.

For the minimum HARQ timing $K_1$, an uplink subframe n is corresponding to a downlink subframe set Ψ(n,$K_1$) requiring HARQ-ACK feedback, and for the minimum HARQ timing $K_2$, the uplink subframe n is corresponding to a downlink subframe set Ψ(n,$K_2$) requiring HARQ-ACK feedback, wherein Ψ(n,$K_i$) is determined according to Table 1 of the forgoing embodiment, and $\Psi(n,K_2)$ can be determined according to one of the Tables 2, 4 and 7 of the forgoing embodiments.

Figure 5:
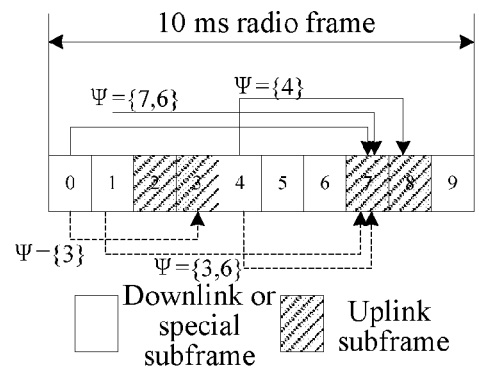
FIG. 5 is a schematic diagram of the timing relationship between the PDSCH and the HARQ-ACK under an uplink and downlink configuration 1 in a TDD system in two scenarios of reducing the 1 ms processing time delay and not reducing the processing time delay.

For TDD, taking the uplink and downlink configuration 1 as an example, when the minimum HARQ timing is $K_1$, the PDSCH and the HARQ-ACK timing as shown by a solid line in the top of FIG. 5 are obtained according to Table 1, when the minimum HARQ timing is $K_2$, the PDSCH and the HARQ-ACK timing as shown by a dashed line in the bottom of FIG. 5 are obtained according to Table 2. As can be seen from FIG. 5, PDSCHs and HARQ-ACK timings of a subframe 0/5 and a subframe 4/9 in a radio frame are different in the two HARQ timings; therefore, when the base station switches from the minimum HARQ timing $K_2$ to the minimum HARQ timing $K_1$, it can be performed in any of the subframes {0,4,5,9}. For subframes 1 and 6, since PDSCHs and HARQ-ACK timings of the two subframes are the same in the two minimum HARQ timings, the switching of the two HARQ timings cannot be realized in the two subframes, or the minimum HARQ timing switching is meaningless (because the timing relationship is not changed).

Figure 6:
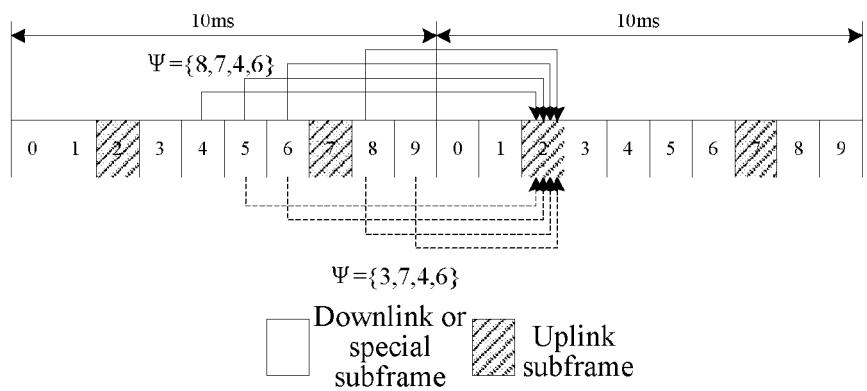
FIG. 6 is a schematic diagram of the timing relationship between the PDSCH and the HARQ-ACK under an uplink and downlink configuration 2 in the TDD system in two scenarios of reducing the 1 ms processing time delay and not reducing the processing time delay.

Additionally, for TDD, in the uplink and downlink configuration 2, when the minimum HARQ timing is $K_1$, the PDSCH and the HARQ-ACK timing as shown by a solid line in the top of FIG. 6 are obtained according to Table 1; when the minimum HARQ timing is $K_2$, the PDSCH and the HARQ-ACK timing as shown by a dashed line in the bottom of FIG. 6 are obtained according to Table 2. As can be seen from FIG. 6, a PDSCH and a HARQ-ACK timing of a subframe 4/9 in a radio frame are different in the two HARQ timings, therefore, when the base station switches from the minimum HARQ timing $K_2$ to the minimum HARQ timing $K_1$, it can be performed in any of the subframes {4,9}. For subframes {0,1,3,5,6,8}, since PDSCHs and HARQ-ACK timings of these subframes are the same in the two HARQ timings, the switching of the two HARQ timings cannot be realized in the these subframes, in other words, the minimum HARQ timing switching is meaningless (because the timing relationship is not changed).

For FDD, the timing relationship of each downlink subframe is different under the two HARQ timings because it is not limited by the configuration of uplink and downlink subframes; therefore, any downlink subframe can be used for switching between the two minimum HARQ timings.

By adopting the method for switching the two HARQ timings described in the embodiment of the present disclosure, the effectiveness in switching is ensured, dynamic backspacing to the minimum timing $K_i=4$ is supported, and HARQ-ACK feedback is performed when the terminal supports the dynamic backspacing to the minimum timing $K_i=4$.

Sixth Embodiment

In the embodiment, the downlink subframe set $\Psi(n,K_i)$ requiring HARQ-ACK feedback corresponding to the uplink subframe n for each minimum HARQ timing can be determined using the solutions of the forgoing embodiments, and will not be repeated in detail in the embodiment. The embodiment focuses on describing the step of transmitting the HARQ-ACK of the transmission data in the downlink subframe set S(n) by the terminal in the uplink subframe n, which includes: determining a channel selection table, a HARQ-ACK codebook size of each serving cell, and a HARQ-ACK order used when the HARQ-ACK is transmitted in a PUCCH In the following, the method for the terminal to transmit the HARQ-ACK in the PUCCH according to the embodiment of the present disclosure will be explained by taking the terminal configured with different HARQ-ACK feedback modes as an example.

When the terminal is configured with one serving cell and the HARQ-ACK feedback mode is configured as HARQ-ACK multiplexing or PUCCH format 1b joint channel selection, a value of M in the channel selection table is determined according to the configured uplink and downlink configurations and one of the above Tables 8 to 12. The HARQ-ACK(i) in the channel selection table is corresponding to a downlink subframe $n-k_i$, wherein $k_i \in S$.

Figure 7:
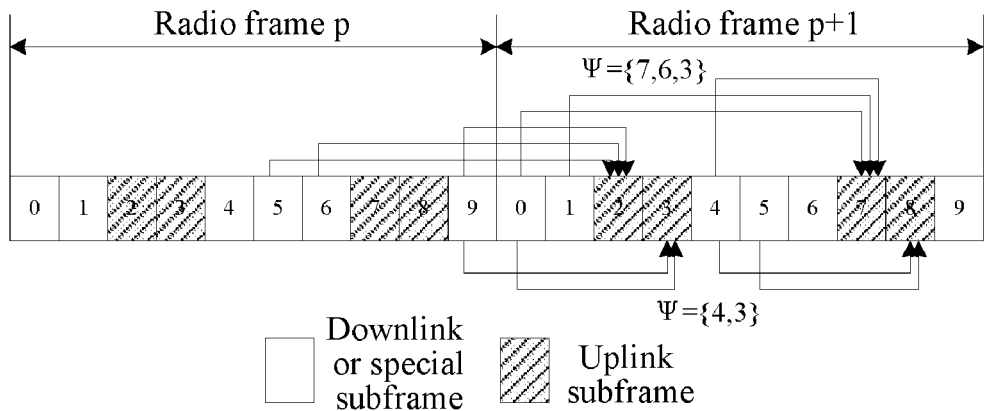
FIG. 7 is a schematic diagram of the timing relationship between the PDSCH and the HARQ-ACK under the uplink and downlink configuration 1 in the TDD system in two scenarios of simultaneously supporting to reduce the 1 ms processing time delay and not reduce the processing time delay.

As shown in FIG. 7, the timing relationship between the PDSCH and the HARQ-ACK shown in Table 8 above is adopted, wherein for the uplink and downlink configuration 1:

an uplink subframe n=2 of a radio frame p+1 is corresponding to a downlink subframe set $S=\{k_0,k_1,k_2\}=\{7,6,3\}$, then a HARQ-ACK(0) is corresponding to a subframe $n-k_0=n-7$, i.e., a HARQ-ACK corresponding to a PDSCH transmitted in a downlink subframe 5 of a radio frame p. Similarly, a HARQ-ACK(1) is corresponding to a subframe $n-k_1=n-6$, i.e., a HARQ-ACK corresponding to a PDSCH transmitted in a downlink subframe 6 of the radio frame p, and a HARQ-ACK(2) is corresponding to a subframe $n-k_2=n-3$, i.e., a HARQ-ACK corresponding to a PDSCH transmitted in a downlink subframe 9 of the radio frame p;

an uplink subframe n=7 of the radio frame p+1 is corresponding to the downlink subframe set $S=\{k_0,k_1,k_2\}=\{7,6,3\}$, then the HARQ-ACK(0) is corresponding to the subframe $n-k_0=n-7$, i.e., a HARQ-ACK corresponding to a PDSCH transmitted in a downlink subframe 0 of the radio frame p+1. Similarly, the HARQ-ACK(1) is corresponding to the subframe $n-k_1=n-6$, i.e., a HARQ-ACK corresponding to a PDSCH transmitted in a downlink subframe 1 of the radio frame p+1, and the HARQ-ACK(2) is corresponding to a subframe $n-k_2=n-3$, i.e., a HARQ-ACK corresponding to a PDSCH transmitted in a downlink subframe 4 of the radio frame p+1.

An uplink subframe n=3 of the radio frame p+1 is corresponding to a downlink subframe set $S=\{k_0,k_1\}=\{4,3\}$, then the HARQ-ACK(0) is corresponding to a subframe $n-k_0=n-4$, i.e., a HARQ-ACK corresponding to a PDSCH transmitted in a downlink subframe 9 of the radio frame p. Similarly, the HARQ-ACK(l) is corresponding to a subframe $n-k_1=n-3$, i.e., a HARQ-ACK corresponding to a PDSCH transmitted in a downlink subframe 0 of the radio frame p.

An uplink subframe n=8 of the radio frame p+1 is corresponding to the downlink subframe set $S=\{k_0,k_1\}=\{4,3\}$, then the HARQ-ACK(0) is corresponding to the subframe $n-k_0=n-4$, i.e., a HARQ-ACK corresponding to a PDSCH transmitted in a downlink subframe 4 of the radio frame p+1. Similarly, the HARQ-ACK(1) is corresponding to the subframe $n-k_1=n-3$, i.e., a HARQ-ACK corresponding to a PDSCH transmitted in a downlink subframe 5 of the radio frame p+1.

When the terminal is configured with one serving cell and the HARQ-ACK feedback mode is configured as PUCCH format 3, a HARQ-ACK codebook size is determined according to the configured uplink and downlink configurations, the transmission mode and one of the above Tables 8 to 12, and a HARQ-ACK codebook size fed back in the uplink subframe n is L=M or L=2M, wherein M is a size of a downlink subframe set in one of the above Tables 8 to 12, and 2M is corresponding to a situation where a double codeword stream transmission mode is configured and spatial binding is not enabled. A bit sequence element $a_i$ or $a_{2i},a_{2i+1}$ is corresponding to a subframe $n-k_i$ or a HARQ-ACK of two codeword streams of the subframe $n-k_i$.

As shown in FIG. 7, the timing relationship between the PDSCH and the HARQ-ACK shown in Table 8 above is adopted, wherein for the uplink and downlink configuration 1, it is assumed that the double codeword stream transmission mode is configured.

The uplink subframe n=2 of the radio frame p+1 is corresponding to the downlink subframe set $S=\{k_0,k_1,k_2\}=\{7,6,3\}$, then a HARQ-ACK codebook size is 6(=3*2), wherein $a_0,a_1$ is corresponding to the subframe $n-k_0=n-7$, i.e., a HARQ-ACK corresponding to two codeword streams of the PDSCH transmitted in the downlink subframe 5 of the radio frame p. Similarly, $a_2,a_3$ is corresponding to the subframe $n-k_1=n-6$, i.e., a HARQ-ACK corresponding to two codeword streams of the PDSCH transmitted in the downlink subframe 6 of the radio frame p, and a4,a5 is corresponding to the subframe $n-k_2=n-3$, i.e., a HARQ-ACK corresponding to two codeword streams of the PDSCH transmitted in the downlink subframe 9 of the radio frame p; and if the corresponding codeword stream or subframe is not scheduled, the corresponding HARQ-ACK state is set as NACK.

The uplink subframe n=7 of the radio frame p+1 is corresponding to the downlink subframe set $S=\{k_0,k_1,k_2\}=\{7,6,3\}$, then the HARQ-ACK codebook size is 6(=3*2), wherein $a_0,a_1$ is corresponding to the subframe $n-k_0=n-7$, i.e., a HARQ-ACK corresponding to two codeword streams of the PDSCH transmitted in the downlink subframe 0 of the radio frame p+1. Similarly, $a_2,a_3$ is corresponding to the subframe $n-k_1=n-6$, i.e., a HARQ-ACK corresponding to two codeword streams of the PDSCH transmitted in the downlink subframe 1 of the radio frame p+1, and a4,a5 is corresponding to the subframe $n-k_2=n-3$, i.e., a HARQ-ACK corresponding to two codeword streams of the PDSCH transmitted in the downlink subframe 4 of the radio frame p+1, and if the corresponding codeword stream or subframe is not scheduled, the corresponding HARQ-ACK state is set as NACK.

The uplink subframe n=2 of the radio frame p+1 is corresponding to the downlink subframe set $S=\{k_0,k_1\}=\{4,3\}$; therefore, the HARQ-ACK codebook size is 4(=2*2), wherein $a_0,a_1$ is corresponding to the subframe $n-k_0=n-4$, i.e., a HARQ-ACK corresponding to two codeword streams of the PDSCH transmitted in the downlink subframe 9 of the radio frame p. Similarly, $a_2,a_3$ is corresponding to the subframe $n-k_1=n-3$, i.e., a HARQ-ACK corresponding to two codeword streams of the PDSCH transmitted in the downlink subframe 0 of the radio frame p+1; if the corresponding codeword stream or subframe is not scheduled, the corresponding HARQ-ACK state is set as NACK.

An uplink subframe n=8 of the radio frame p+1 is corresponding to the downlink subframe set $S=\{k_0,k_1\}=\{4,3\}$, therefore, the HARQ-ACK codebook size is 4(=2*2), wherein a $a_0,a_1$ is corresponding to the subframe $n-k_0=n-4$, i.e., a HARQ-ACK corresponding to two codeword streams of the PDSCH transmitted in the downlink subframe 4 of the radio frame p+1. Similarly, $a_2,a_3$ is corresponding to the subframe $n-k_1=n-3$, i.e., a HARQ-ACK corresponding to two codeword streams of the PDSCH transmitted in the downlink subframe 5 of the radio frame p+1; if the corresponding codeword stream or subframe is not scheduled, the corresponding HARQ-ACK state is set as NACK.

Alternatively, when the terminal is configured with one serving cell and the HARQ-ACK feedback mode is configured as PUCCH format 3, the HARQ-ACK codebook size is determined according to the configured uplink and downlink configurations, the transmission mode and one of the above Tables 8 to 12, and the HARQ-ACK codebook size fed back in the uplink subframe n is L=M or L=2M, wherein M is the size of the downlink subframe set in one of the above Tables 8 to 12, and 2M is corresponding to a situation where a double codeword stream transmission mode is configured and spatial binding is not enabled. The subframe $n-k_i$ or the HARQ-ACK of two codeword streams of the subframe $n-k_i$, is corresponding to a bit sequence element $a_{DAI(ki)-1}$ or $a_{2DAI(ki)-2},a_{2DAI(ki)-1}$, wherein $DAI(k_i)$ is a Downlink Assignment Indicator (DAI) value in Downlink Control Information (DCI) transmitted by the subframe $n-k_i$.

Figure 8:
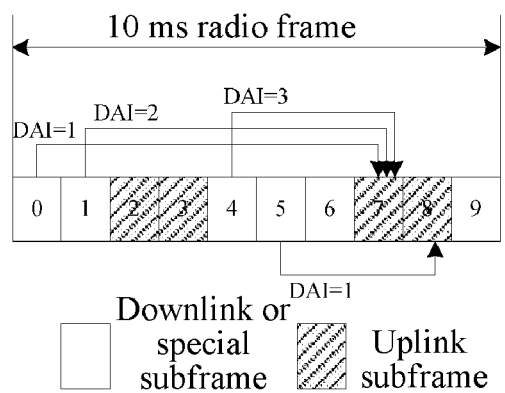
FIG. 8 is a schematic diagram of scheduling the PDSCH and determining a HARQ-ACK codebook size and a bit sequence under the uplink and downlink configuration 1 in the TDD system in two scenarios of simultaneously supporting to reduce the 1 ms processing time delay and not reduce the processing time delay.

As shown in FIG. 8, the timing relationship between the PDSCH and the HARQ-ACK shown in Table 8 above is adopted, wherein for the uplink and downlink configuration 1, it is assumed that a single codeword stream transmission mode is configured.

For the subframe 7, a HARQ-ACK codebook size can be determined as L=3 according to Table 8. At the same time, HARQ-ACKs of subframes 0, 1 and 4 are all transmitted in the subframe 7 according to the scheduling of the base station, and DAI values in the downlink DCI of the subframes 0, 1 and 4 are 1, 2 and 3 in turn, so bit sequences $a_0$, $a_1$ and $a_2$ fed back in the subframe 7 are corresponding to the HARQ-ACKs of the subframes 0, 1 and 4 (i.e., subframes with DAI of 1, 2 and 3) in turn.

For the subframe 8, a HARQ-ACK codebook size can be determined as L=2 according to Table 8 Meanwhile, a bit sequence $a_0$ fed back in the subframe 8 is corresponding to a HARQ-ACK in the subframe 5 (a subframe with DAI of 1) according to the scheduling of the base station, and $a_1$ in the bit sequence is set as NACK.

Figure 9:
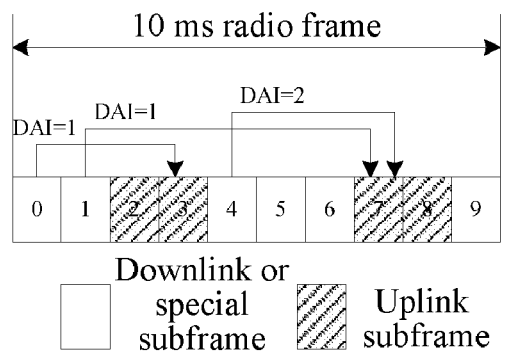
FIG. 9 is another schematic diagram of scheduling the PDSCH and determining the HARQ-ACK codebook size and the bit sequence under the uplink and downlink configuration 1 in the TDD system in two scenarios of simultaneously supporting to reduce the 1 ms processing time delay and not reduce the processing time delay.

As shown in FIG. 9, the timing relationship between the PDSCH and the HARQ-ACK shown in Table 8 above is adopted, wherein for the uplink and downlink configuration 1, it is assumed that a single codeword stream transmission mode is configured.

For the subframe 3, a HARQ-ACK codebook size can be determined as L=2 according to Table 8. Meanwhile, a bit sequence $a_0$ fed back in the subframe 3 is corresponding to a HARQ-ACK in the subframe 0 (a subframe with DAI of 1) according to the scheduling of the base station, and $a_1$ in the bit sequence is set as NACK.

Figure 10:
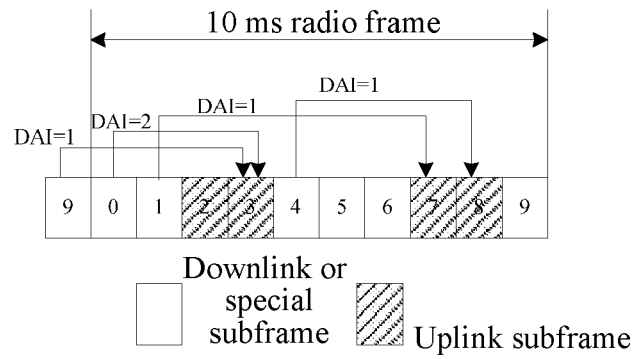
FIG. 10 is another schematic diagram of scheduling the PDSCH and determining the HARQ-ACK codebook size and the bit sequence under the uplink and downlink configuration 1 in the TDD system in two scenarios of simultaneously supporting to reduce the 1 ms processing time delay and not reduce the processing time delay.

For the subframe 7, a HARQ-ACK codebook size can be determined as L=3 according to Table 8. At the same time, HARQ-ACKs of subframes 1 and 4 are both transmitted in the subframe 7 according to the scheduling of the base station, and DAI values in the downlink DCI of the subframes 1 and 4 are 1 and 2 in turn, so $a_0$ and $a_1$ in the bit sequence fed back in the subframe 7 are corresponding to the HARQ-ACKs of the subframes 1 and 4 (i.e., subframes with DAI of 1 and 2) in turn. Meanwhile, $a_2$ in the bit sequence is set as NACK As shown in FIG. 10, the timing relationship between the PD SCH and the HARQ-ACK shown in Table 8 above is adopted, wherein for the uplink and downlink configuration 1, it is assumed that a single codeword stream transmission mode is configured.

For the subframe 3, the HARQ-ACK codebook size can be determined as L=2 according to Table 8. Meanwhile, HARQ-ACKs of subframes 9 and 0 are both transmitted in the subframe 3, and bit sequences $a_0,a_1$ fed back in the subframe 3 are corresponding to HARQ-ACKs in the subframes 9 and 0 (subframes with DAI of 1 and 2) in turn according to the scheduling of the base station.

For the subframe 7, the HARQ-ACK codebook size can be determined as L=3 according to Table 8. Meanwhile, the bit sequence $a_0$ fed back in the subframe 7 is corresponding to a HARQ-ACK in the subframe 1 (i.e., a subframe with DAI of 1) according to the scheduling of the base station, and $a_1$ and $a_2$ in the bit sequence are set as NACK at the same time.

For the subframe 8, the HARQ-ACK codebook size can be determined as L=2 according to Table 8. Meanwhile, the bit sequence $a_0$ fed back in the subframe 8 is corresponding to a HARQ-ACK in the subframe 4 (i.e., a subframe with DAI of 1) according to the scheduling of the base station, and at in the bit sequence is set as NACK at the same time.

For the case where the bit sequence in the above HARQ-ACK codebook is based on DAI sorting, a DAI value thereof is determined by the base station according to a HARQ-ACK timing of a currently scheduled subframe when performing downlink scheduling, and subframe accumulation is performed on DAI values of downlink subframes performing HARQ-ACK feedback in the same uplink subframe.

The foregoing embodiment is directed to a scenario of one serving cell, the method may be extended to a scenario in which the serving cells are aggregated. The processing procedure for each serving cell is substantially the same as the single serving cell described in the foregoing embodiment. For aggregating TDD serving cells with different uplink and downlink configurations, or the serving cells supporting enhanced Interference Management Traffic Adaptation (eIMTA), or the FDD-TDD aggregation, it is only needed to replace the above uplink and downlink configurations with the downlink-reference uplink and downlink configurations, which are related arts and will not be elaborated here.

By adopting the HARQ-ACK transmitting method described in the embodiment, dynamic switching of various HARQ timings can be supported, and at the same time, both the transmitting and receiving parties have consistent understanding of the transmitted HARQ-ACK, thus realizing normal transmission of downlink data.

Seventh Embodiment

When the base station configures the terminal to operate in the 1 ms processing time delay reduction mode ($K_i=2/3$) through a high-level signaling, and the terminal allows receiving downlink control information indicating that the terminal backspaces to the mode of not reducing the 1 ms processing time delay ($K_i=4$) within a configuration period of the high-level signaling, the terminal supports more than one minimum HARQ timings.

The method according to the embodiments of the present disclosure is illustrated in detail by taking the terminal supporting two minimum HARQ timings in an FDD system as an example.

When the base station configures the terminal to operate under the 1 ms processing time delay reduction mode ($K_i=2/3$) through a high-level signaling, and the terminal allows receiving downlink control information indicating that the terminal backspaces to the mode of not reducing the 1 ms processing time delay ($K_i=4$) within a configuration period of the high-level signaling, the method for the terminal to feed back HARQ-ACK is different from the method in the second embodiment to ensure that the base station and the terminal have consistent understanding of the HARQ-ACK fed back by the terminal.

Figure 11:
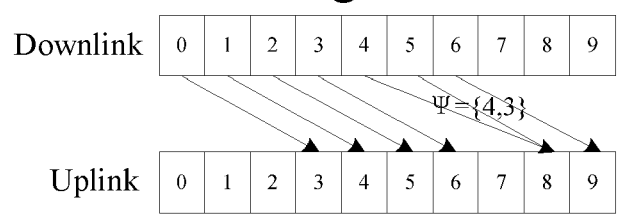
FIG. 11 is a schematic diagram of a HARQ timing in the FDD system in two scenarios of simultaneously supporting to reduce the 1 ms processing time delay and not reduce the processing time delay.

For FDD, as shown in FIG. 11, it is assumed that the terminal is configured in a mode of reducing 1 ms processing time delay and the processing time delay is 3 ms ($K_i=3$), if the terminal allows receiving downlink control information indicating that the terminal backspaces to the mode of not reducing the 1 ms processing time delay ($K_i=4$), when the terminal feeds back a HARQ-ACK, the HARQ-ACK size will be different in each subframe, for example, the HARQ-ACK of one subframe is fed back in the uplink subframe 6, while the HARQ-ACKs of two uplink subframes are fed back in the subframe 8, and the terminal may miss one subframe, then the terminal will only feed back the HARQ-ACK of one downlink subframe. This will cause the terminal and the base station to have inconsistent understanding of the HARQ-ACK transmitted.

In order to avoid this situation, it is supposed that the minimum HARQ timing corresponding to the scenario where the terminal adopts the mode of not reducing the 1 ms processing time delay is $K_i$, while the minimum HARQ timing corresponding to the scenario where the terminal adopts the mode of reducing the 1 ms processing time delay is $K_2$ It is assumed that $K_i=4$, and $K_2=3$ here. The meaning of the minimum HARQ timing $K_i$ or $K_2$ here is the same as that described in the fourth embodiment.

Different from the TDD system, for the FDD system, each uplink subframe n is corresponding to the downlink subframe set $\Psi(n,K_1)=\{4\}$ requiring HARQ-ACK feedback, while for the minimum HARQ timing $K_2$, the uplink subframe n is corresponding to the downlink subframe set $\Psi(n,K_2)=\{3\}$ requiring HARQ-ACK feedback.

All the downlink subframe sets corresponding to the above two minimum HARQ timings are defined as S(n), wherein S(n) is a union set of $\Psi(n,K_1)$ and $\Psi(n,K_2)$, and the terminal transmits a HARQ-ACK of transmission data of the downlink subframe set S(n) in the uplink subframe n, wherein S(n)={4,3}.

In this way, even if the terminal misses to detect the PDCCH, the terminal and the base station can have consistent understanding of HARQ-ACK transmitted by the terminal.

Figure 12:
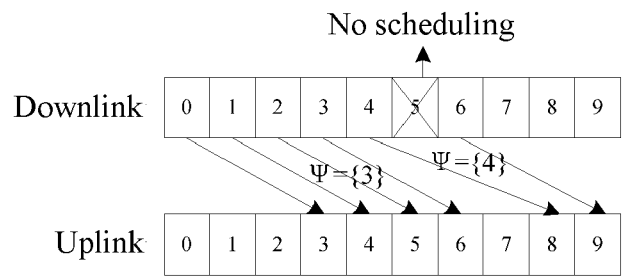
FIG. 12 is another schematic diagram of the HARQ timing in the FDD system in two scenarios of simultaneously supporting to reduce the 1 ms processing time delay and not reduce the processing time delay.

Alternatively, as shown in FIG. 12, when the PDSCH scheduled by the subframe 4 adopts the minimum HARQ timing $K_1=4$ (the subframe 4 is referred to as a backspaced subframe at this time) by the base station, when the processing time delay reduced for the 1 ms processing time delay is 3 ms/2 ms, the base station will not schedule the PDSCH with the minimum HARQ timing of 3/2 in the last 1/2 subframe (i.e., subframe 5 or subframes 5 and 6) of the subframe 4. In this way, the terminal may feed back according to the HARQ-ACK of one subframe (all $\Psi(n,4)$, $\Psi(n,3)$ and $\Psi(n,2)$ in the FDD system include one element). In other words, when the terminal receives the scheduling with a minimum timing $K_a$ in a subframe m, the terminal will not (expect) receive the scheduling with a minimum timing of $K_b$ in ($K_a-K_b$) subframes after the subframe m, in other words, the UE will not use the scheduling with the minimum timing of $K_b$ on the ($K_a-K_b$) subframes after the subframe m for HARQ-ACK feedback, wherein $K_b<K_a$, $K_a,K_b\in\{K_1, K_2, \ldots, K_P\}$, and the HARQ-ACK of the downlink subframe m is transmitted in the uplink subframe n.

The above embodiment is directed at the scenario of one serving cell. The method can be extended to a scenario in which the serving cells are aggregated. For each serving cell, the processing is the same as that of the single serving cell described in the above embodiment, and will not be elaborated here.

Eighth Embodiment

Figure 13:
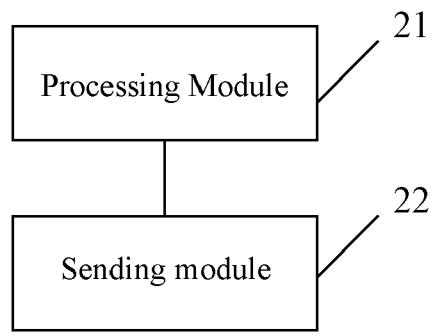
FIG. 13 is a schematic diagram of an apparatus for sending uplink control information according to an embodiment of the present disclosure.

As shown in FIG. 13, the embodiments of the present disclosure also relate to an apparatus for sending uplink control information for implementing the above-mentioned methods, which includes: a processing module 21 configured to determine a downlink subframe set S(n) corresponding to P minimum HARQ timings, wherein S(n) is a union set of all downlink subframe sets $\Psi(n,K_i)$, P is an integer greater than 1, n is an integer greater than or equal to 0, $K_i$ is an integer greater than 0, but less than or equal to 4, and i is an integer greater than or equal to 1, but less than or equal to P; and a sending module 22 configured to transmit, by the terminal in an uplink subframe n, a Hybrid Automatic Repeat reQuest Acknowledgement (HARQ-ACK) corresponding to transmission data in the downlink subframe set S(n) or the downlink subframe set $\Psi(n,K_i)$.

In an implementation manner, the processing module 21 is also configured to: when performing HARQ-ACK feedback in the uplink subframe n, determine the downlink subframe set $\Psi(n,K)$ requiring HARQ-ACK feedback corresponding to each minimum HARQ timing in the uplink subframe n, wherein the P minimum HARQ timings are $K_1$, $K_2, \ldots, K_P$ respectively, $K_1 > K_2 > \ldots > K_P$; and P>1, and i=1, 2, ..., P.

In an implementation manner, the processing module 21 is configured to determine the minimum HARQ timing used by the subframe according to the downlink control information.

In an implementation manner, the processing module 21 is configured to: for a Time Division Duplexing (TDD) system, determine the downlink subframe set $\Psi(n,K_i)$ according to the minimum HARQ timing, uplink and downlink configurations, and/or downlink-reference uplink and downlink configurations.

In an implementation manner, the processing module 21 is configured to: sort elements in the downlink subframe set S(n) according to an order of $\Psi(n,K_i)$, $\Psi(n,K_2)$, ..., $\Psi(n,K_P)$; wherein, for the same elements contained in two or more than two sets $\Psi(n,K_i)$, $\Psi(n,K_2)$, ..., $\Psi(n,K_P)$, the set S(n) only contains the element that appears for the first time.

In an implementation manner, the sending module 22 is configured to:
determine a channel selection table, or a HARQ-ACK codebook size, and a HARQ-ACK order used when the HARQ-ACK is transmitted in a Physical Uplink Control Channel (PUCCH).

In an implementation manner, the sending module 22 is configured to:
determine a value of M in the channel selection table according to the downlink subframe set S(n) or the downlink subframe set $\Psi(n,K_i)$ when the terminal is configured as HARQ-ACK multiplexing or PUCCH format 1b joint channel selection, a HARQ-ACK(i) in the channel selection table corresponding to a downlink subframe n–$k_i$, wherein $k_i \in S$(n) or $\Psi(n,K_i)$, and is an element in the set S(n) or $\Psi(n,K_i)$; and
when the terminal is configured as PUCCH format 3, a single codeword stream transmission mode or a double codeword stream transmission mode is configured and spatial binding is enabled, the HARQ-ACK codebook size L of each serving cell is equal to M, and when the double codeword stream transmission mode is configured and the spatial binding is not enabled, the HARQ-ACK codebook size L of each serving cell is equal to 2M.

In an implementation manner, the sending module 22 is configured to:
an element $a_i$ or $a_{2i},a_{2i+1}$ in an HARQ-ACK bit sequence of each serving cell transmitted in the PUCCH format 3 corresponding to a subframe n–$k_i$ or HARQ-ACK of two codeword streams of the subframe n–$k_i$; or,
the subframe n–$k_i$ or the HARQ-ACK of two codeword streams of the subframe n–$k_i$ corresponding to a bit sequence element $a_{DAI(ki)-1}$ or $a_{2DAI(ki)-2},a_{2DAI(ki)-1}$, wherein DAI(ki) is a Downlink Assignment Indicator (DAI) value in downlink DCI transmitted by the subframe n–$k_i$.

In an implementation manner, the sending module 22 is configured to:
when the HARQ-ACK bit sequence is sorted based on DAI, determine a DAI value thereof according to a HARQ-ACK timing of a currently scheduled subframe when performing downlink scheduling, and perform subframe accumulation on DAI values of downlink subframes performing HARQ-ACK feedback in the same uplink subframe.

In an implementation manner, the processing module 21 is configured to.
for a FDD system, when the terminal receives scheduling with a minimum timing $K_a$ in a downlink subframe m, not transmit a HARQ-ACK corresponding to the scheduling when the terminal receives scheduling with a minimum timing $K_b$ in ($K_a$–$K_b$) subframes after the downlink subframe m, wherein $K_b < K_a$, $K_a, K_b \in \{K_i, K_2, \ldots, K_P\}$, and transmit a HARQ-ACK of the downlink subframe m in the uplink subframe.

Ninth Embodiment

The embodiments of the present disclosure also relate to a computer program, a storage medium storing the program, and a terminal.

The program is used to implement transmitting of the above-mentioned uplink control information, including:
for a terminal supporting minimum timing P minimum Hybrid Automatic Repeat reQuest (HARQ) timings, determining a downlink subframe set S(n) corresponding to the P minimum HARQ timings, wherein S(n) is a union set of all downlink subframe sets $\Psi(n,K_i)$, P is an integer greater than 1, n is an integer greater than or equal to 0, $K_i$ is an integer greater than 0, but less than or equal to 4, and i is an integer greater than or equal to 1, but less than or equal to P; and
transmitting, by the terminal in an uplink subframe n, a Hybrid Automatic Repeat reQuest Acknowledgement (HARQ-ACK) corresponding to transmission data in the downlink subframe set S(n) or the downlink subframe set $\Psi(n,K_i)$.

In an implementation manner, before the determining the downlink subframe set S(n) corresponding to the P minimum HARQ timings, the program further includes:
when the terminal performs HARQ-ACK feedback in the uplink subframe n, determining the downlink subframe set $\Psi(n,K_i)$ requiring HARQ-ACK feedback corresponding to each minimum HARQ timing in the uplink subframe n, wherein the P minimum HARQ timings are $K_1, K_2, \ldots, K_P$ respectively, $K_1 > K_2 > \ldots > K_P$; and P>1, and i=1, 2, ..., P.

In an implementation manner, the terminal determines the minimum HARQ timing used by the subframe according to the downlink control information.

In an implementation manner, when a minimum HARQ timing of a downlink subframe j received by the terminal is $K_x$, while the minimum HARQ timing of the last downlink subframe received previously is $K_y$, and $K_x > K_y$, then the terminal performs a fallback operation of the minimum HARQ timing in the downlink subframe j; wherein the downlink subframe j has different HARQ timings when the minimum HARQ timings are $K_x$ and $K_y$, and $K_x$, $K_y \in \{K_1, K_2, \ldots, K_P\}$.

In an implementation manner, for a Time Division Duplexing (TDD) system, the downlink subframe set $\Omega(n, K_i)$ is determined according to at least one of the minimum HARQ timing, uplink and downlink configurations and downlink-reference uplink and downlink configurations.

In an implementation manner, the downlink subframe set $\Psi(n,K_i)$ is obtained according to Tables 1, 2, 3, 4, 5 or 7.

TABLE 1

| Uplink and downlink configuration | Subframe n ($K_i = 4$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 2

| Uplink and downlink configuration | Subframe n ($K_i = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 3, 7, 4, 6 | — | — | — | — | 3, 7, 4, 6 | — | — |
| 3 | — | — | 7, 6, 5 | 4, 5 | 3, 4 | — | — | — | — | — |
| 4 | — | — | 6, 8, 7, 11 | 6, 5, 4, 3 | — | — | — | — | — | — |
| 5 | — | — | 3, 12, 9, 8, 7, 5, 4, 11, 6 | — | — | — | — | — | — | — |
| 6 | — | — | 6 | 4 | 4 | — | — | 6 | 3 | — |

TABLE 4

| Uplink and downlink configuration | Subframe n ($K_i = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3- | — | — | — | 3 | 3 |
| 1 | — | — | 3, 6 | 3 | — | — | — | 3, 6 | 3 | — |
| 2 | — | — | 3, 7, 4, 6 | — | — | — | — | 3, 7, 4, 6 | — | — |
| 3 | — | — | 7, 6, 5, 4, 3 | 3 | 3 | — | — | — | — | — |
| 4 | — | — | 8, 7, 6, 5, 4, 3, 11 | 3 | — | — | — | — | — | — |
| 5 | — | — | 3, 12, 9, 8, 7, 5, 4, 11, 6 | — | — | — | — | — | — | — |
| 6 | — | — | 6, 3 | 3 | 3 | — | — | — | 3 | — |

TABLE 7

| Uplink and downlink configuration | Subframe n ($K_i = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 3, 7, 4, 6 | — | — | — | — | 3, 7, 4, 6 | — | — |
| 3 | — | — | 7, 6, 5 | 4, 5 | 3, 4 | — | — | — | — | — |
| 4 | — | — | 6, 8, 7, 11 | 6, 5, 4, 3 | — | — | — | — | — | — |
| 5 | — | — | 3, 12, 9, 8, 7, 5, 4, 11, 6 | — | — | — | — | — | — | — |
| 6 | — | — | 6, 3 | 3 | 3 | — | — | — | 3 | — |

TABLE 3

| Uplink and downlink configuration | Subframe n ($K_i = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |
| 2 | — | — | 3, 2, 4, 6 | — | — | — | — | 3, 2, 4, 6 | — | — |
| 3 | — | — | 7, 6, 5 | 4, 5 | 3, 4 | — | — | — | — | — |
| 4 | — | — | 5, 8, 7, 6 | 3, 5, 4,, 2 | — | — | — | — | — | — |
| 5 | — | — | 3, 2, 9, 8, 7, 5, 4, 11, 6 | — | — | — | — | — | — | — |
| 6 | — | — | 3 | 3 | 3 | — | — | 2 | 2 | — |

TABLE 5

| Uplink and downlink configuration | Subframe n ($K_i = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |
| 2 | — | — | 3, 2, 4, 6 | — | — | — | — | 3, 2, 4, 6 | — | — |
| 3 | — | — | 7, 6, 5, 4, 3, 2 | 2 | — | — | — | — | — | — |
| 4 | — | — | 8, 7, 6, 5, 4, 3, 2 | 2 | — | — | — | — | — | — |
| 5 | — | — | 3, 2, 9, 8, 7, 5, 4, 11, 6 | — | — | — | — | — | — | — |
| 6 | — | — | 3, 2 | 2 | — | — | — | 2 | 2 | — |

TABLE 5-continued

In an implementation manner, elements in the downlink subframe set S(n) are sorted according to an order of $\Psi(n,K_1), \Psi(n,K_2), \ldots, \Psi(n,K_P)$; and for the same elements contained in two or more than two sets $\Psi(n,K_1), \Psi(n,K_2), \ldots, \Psi(n,K_P)$, the set S(n) only contains the element that appears for the first time.

In an implementation manner, the downlink subframe set S(n) is included in Tables 8, 9, 10, 11 Or 12.

TABLE 8

| Uplink and downlink configuration | Subframe n ($K_1 = 4, K_2 = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 4, 3 | — | — | 6 | 3 | 4, 3 |
| 1 | — | — | 7, 6, 3 | 4, 3 | — | — | — | 7, 6, 3 | 4, 3 | — |
| 2 | — | — | 8, 7, 4, 6, 3 | — | — | — | — | 8, 7, 4, 6, 3 | — | — |
| 3 | — | — | 7, 6, 11, 5 | 6, 5, 4 | 5, 4, 3 | — | — | — | — | — |
| 4 | — | — | 12, 8, 7, 11, 6 | 7, 6, 5, 4, 3 | — | — | — | — | — | — |
| 5 | — | — | 13, 12, 9, 8, 7, 5, 4, 11, 6, 3, | — | — | — | — | — | — | — |
| 6 | — | — | 7, 6 | 7, 4 | 5, 4 | — | — | 7, 6 | 7, 3 | — |

TABLE 9

| Uplink and downlink configuration | Subframe n ($K_1 = 4, K_2 = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 4, 3 | — | — | 6 | 3 | 4, 3 |
| 1 | — | — | 7, 6, 3 | 4, 3 | — | — | — | 7, 6, 3 | 4, 3 | — |
| 2 | — | — | 8, 7, 4, 6, 3 | — | — | — | — | 8, 7, 4, 6, 3 | — | — |
| 3 | — | — | 7, 6, 11, 5, 4, 3 | 6, 5, 3 | 5, 4, 3 | — | — | — | — | — |

TABLE 9-continued

| Uplink and downlink configuration | Subframe n ($K_1 = 4$, $K_2 = 3$) | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11, 6, 5, 4, 3, | 7, 6, 5, 4, 3 | — | — | — | — | — | — |
| 5 | — | — | 13, 12, 9, 8, 7, 5, 4, 11, 6, 3, | — | — | — | — | — | — | — |
| 6 | — | — | 7, 6, 3 | 7, 3 | 5, 3 | — | — | 7 | 7, 3 | — |

TABLE 10

| Uplink and downlink configuration | Subframe n ($K_1 = 4$, $K_2 = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 4, 3 | — | — | 6 | 3 | 4, 3 |
| 1 | — | — | 7, 6, 3 | 4, 3 | — | — | — | 7, 6, 3 | 4, 3 | — |
| 2 | — | — | 8, 7, 4, 6, 3 | — | — | — | — | 8, 7, 4, 6, 3 | — | — |
| 3 | — | — | 7, 6, 11, 5 | 6, 5, 4 | 5, 4, 3 | — | — | — | — | — |
| 4 | — | — | 12, 8, 7, 11, 6 | 7, 6, 5, 4, 3 | — | — | — | — | — | — |
| 5 | — | — | 13, 12, 9, 8, 7, 5, 4, 11, 6, 3, | — | — | — | — | — | — | — |
| 6 | — | — | 7, 6, 3 | 7, 3 | 5, 3 | — | — | 7 | 7, 3 | — |

TABLE 11

| Uplink and downlink configuration | Subframe n ($K_1 = 4$, $K_2 = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 2 | 2 | 4 | — | — | 6, 2 | 2 | 4 |
| 1 | — | — | 7, 6, 3, 2, | 4, 2 | — | — | — | 7, 6, 3, 2, | 4, 2 | — |
| 2 | — | — | 8, 7, 4, 6, 3, 2, | — | — | — | — | 8, 7, 4, 6, 3, 2, | — | — |
| 3 | — | — | 7, 6, 11, 5, | 6, 5, 4 | 5, 4, 3 | — | — | — | — | — |
| 4 | — | — | 12, 8, 7, 11, , 6, 5, | 7, 6, 5, 4, 3, 2 | — | — | — | — | — | — |
| 5 | — | — | 13, 12, 9, 8, 7, 5, 4, 11, 6, 3, 2 | — | — | — | — | — | — | — |
| 6 | — | — | 7, 3 | 7, 3 | 5, 3 | — | — | 7, 2 | 7, 2 | — |

TABLE 12

| Uplink and downlink configuration | Subframe n ($K_1 = 4$, $K_2 = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 2 | 2 | 4 | — | — | 6, 2 | 2 | 4 |
| 1 | — | — | 7, 6, 3, 2 | 4, 2 | — | — | — | 7, 6, 3, 2 | 4, 2 | — |
| 2 | — | — | 8, 7, 4, 6, 3, 2 | — | — | — | — | 8, 7, 4, 6, 3, 2 | — | — |
| 3 | — | — | 7, 6, 11, 5, 4, 3, 2, | 6, 5, 2 | 5, 4 | — | — | — | — | — |

TABLE 12-continued

| Uplink and downlink configuration | Subframe n ($K_1 = 4$, $K_2 = 2$) | | | | | | | | |
|---|---|---|---|---|---|---|---|---|---|
| | 0 | 1 | 2 | 3 | 4 | 5 | 6 | 7 | 8 | 9 |
| 4 | — | — | 12, 8, 7, 11, 6, 5, 4, 3, 2 | 7, 6, 5, 4, 2 | — | — | — | — | — | — |
| 5 | — | — | 13, 12, 9, 8, 7, 5, 4, 11, 6, 3, 2 | — | — | — | — | — | — | — |
| 6 | — | — | 7, 3, 2 | 7, 2 | 5 | — | — | 7, 2 | 7, 2 | — |

In an implementation manner, the transmitting, by the terminal in the uplink subframe n, the HARQ-ACK of the transmission data in the downlink subframe set S(n) or the downlink subframe set $\Psi(n,K_i)$ includes:

determining a channel selection table, a HARQ-ACK codebook size of each serving cell, and a HARQ-ACK order used when the HARQ-ACK is transmitted in a Physical Uplink Control Channel PUCCH.

In an implementation manner, a value of M in the channel selection table is determined according to the downlink subframe set S(n) or the downlink subframe set $\Psi(n,K_i)$ when the terminal is configured as HARQ-ACK multiplexing or PUCCH format 1b joint channel selection; a HARQ-ACK(i) in the channel selection table corresponding to a downlink subframe $n-k_i$, wherein $k_i \in S(n)$ or $\Psi(n,K_i)$ is an element in the set S(n) or $\Psi(n,K_i)$; and when the terminal is configured as a PUCCH format 3, a single codeword stream transmission mode or a double codeword stream transmission mode is configured and spatial binding is enabled, and the HARQ-ACK codebook size L of each serving cell is equal to M; and when the double codeword stream transmission mode is configured and the spatial binding is not enabled, the HARQ-ACK codebook size L of each serving cell is equal to 2M.

In an implementation manner, an element $a_i$ or $a_{2i}, a_{2i+1}$ in an HARQ-ACK bit sequence of each serving cell transmitted in the PUCCH format 3 is corresponding to a subframe $n-k_i$ or HARQ-ACK of two codeword streams of the subframe $n-k_i$; or, the subframe $n-k_i$ or the HARQ-ACK of two codeword streams of the subframe $n-k_i$ corresponding to a bit sequence element $a_{DAI(ki)-1}$ or $a_{2DAI(ki)-2}, a_{2DAI(ki)-1}$, wherein $DAI(k_i)$ is a Downlink Assignment Indicator (DAI) value in downlink DCI transmitted by the subframe $n-k_i$.

In an implementation manner, when the HARQ-ACK bit sequence is sorted based on DAI, a DAI value thereof is determined according to a HARQ-ACK timing of a currently scheduled subframe when performing downlink scheduling, and subframe accumulation is performed on DAI values of downlink subframes performing HARQ-ACK feedback in the same uplink subframe.

In an implementation manner, the transmitting, by the terminal in the uplink subframe n, the HARQ-ACK of the transmission data in the downlink subframe set $\Psi(n,K_i)$ includes: for a FDD system, when the terminal receives scheduling with a minimum timing $K_a$ in a downlink subframe m, not transmit a HARQ-ACK corresponding to the scheduling when the terminal receives scheduling with a minimum timing $K_b$ in $(K_a-K_b)$ subframes after the downlink subframe m, wherein $K_b < K_a$, $K_a, K_b \in \{K_1, K_2, \ldots, K_P\}$, and transmitting a HARQ-ACK of the downlink subframe m in the uplink subframe n, wherein m is an integer different from n, and greater than or equal to 0.

The storage medium is mainly used for storing the above program. Therefore, the program in the storage medium is not described in detail in this embodiment as long as the storage medium can store the above program.

Figure 14:
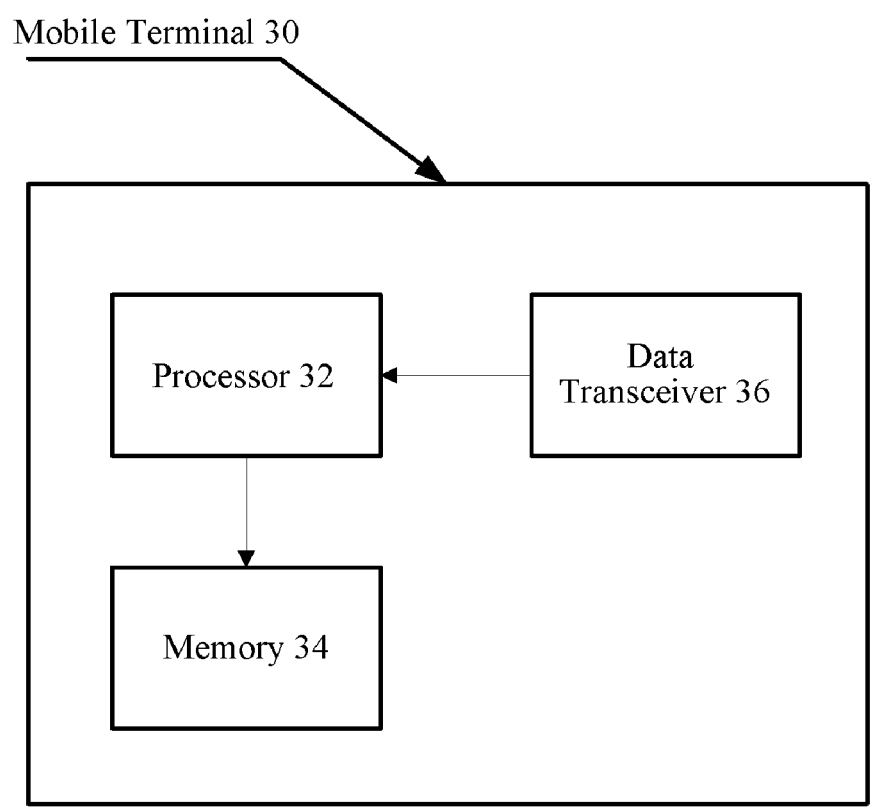
FIG. 14 is a schematic diagram of a hardware structure of a mobile terminal for implementing the method for sending uplink control information according to an embodiment of the present disclosure.

The technical solution of the method for sending uplink control information disclosed in the foregoing embodiments may be executed in a terminal device to obtain a corresponding terminal device. The terminal may be a mobile terminal (a device having a processing function such as a mobile phone or a tablet), or may be a base station, a computer terminal, or a similar apparatus. The embodiment is described as an example of operating on a mobile terminal. FIG. 14 is a schematic diagram of a hardware structure of a mobile terminal for implementing the method for sending uplink control information according to an embodiment of the present disclosure. As shown in FIG. 14, a mobile terminal 30 may include one or more (only one is shown in the figure) processor 32 (the processor 32 may include, but is not limited to, a processing apparatus such as a Microprocessor MCU or a Programmable Logic Device FPGA), a memory 34 for data storage, and a data transceiver 36 for communication functions. Those of ordinary skills in the art will understand that the structure as shown in FIG. 14 is only schematic, and does not impose a single limitation on the structures of the above electronic apparatuses. For instance, the mobile terminal 30 may further include more or less components than those shown in FIG. 14 or have a configuration different from that shown in FIG. 14 by splitting or merging the above functions.

The memory 34 can be configured as a software program and a module for storing application software, and the program instruction/module corresponding to the method for sending uplink control information disclosed in the foregoing embodiments can be stored in the memory 34. The method for sending uplink control information has been described in detail in the previous embodiments, and will not be repeated in detail in this embodiment.

The processor 32 performs various functional applications and data processing, i.e., implements the above methods, by running the software programs and modules stored in the memory 304. The memory 34 may include a high-speed random memory and may also include a non-volatile memory such as one or more magnetic storage devices, flash memory, or other non-volatile solid-state memory. In some examples, the memory 34 may further include memories (cloud memories) remotely disposed for the processor 32, which may be connected to the mobile terminal 30 through a network. Examples of the above networks include, but are not limited to, the Internet, enterprise intranets, local area networks, mobile communication networks, and combinations thereof.

The data transceiver 36 is configured to receive or transmit data via a network. The specific example of the network described above may include a wireless network provided by a communication provider of the mobile terminal 30. In one example, the transmitting apparatus 36 includes a Network Interface Controller (NIC) that can be connected to other network devices through a base station so as to be able to communicate with the Internet. In one example, the transmitting apparatus 36 may be a Radio Frequency (RF) module configured to communicate with the Internet wirelessly. Although the embodiments of the present disclosure have been disclosed for illustrative purposes, those skilled in the art will recognize that various modifications, additions and substitutions are possible. Therefore, the scope of the present application should not be limited to the foregoing embodiments.

INDUSTRIAL APPLICABILITY

The embodiments of the present disclosure can perform HARQ-ACK feedback for a plurality of minimum HARQ timings, thus implementing the effect of reducing the time delay.

What is claimed is:

1. A method for sending uplink control information, comprising:
   for a terminal supporting P minimum Hybrid Automatic Repeat reQuest (HARQ) timings, determining a downlink subframe set S(n) corresponding to the P minimum HARQ timings, wherein S(n) is a union set of all downlink subframe sets $\psi(n,K_i)$, P is an integer greater than 1, n is an integer greater than or equal to 0, $K_i$ is an integer greater than 0, but less than or equal to 4, and i is an integer greater than or equal to 1, but less than or equal to P; and
   transmitting, by the terminal in an uplink subframe n, a Hybrid Automatic Repeat reQuest ACKnowledgement (HARQ-ACK) corresponding to transmission data in the downlink subframe set S(n) or the downlink subframe set $\psi(n,K_i)$,
   wherein before determining the downlink subframe set S(n) corresponding to the P minimum HARQ timings, the method further comprises:
   when the terminal performs HARQ-ACK feedback in the uplink subframe n, determining the downlink subframe set $\psi(n,K_i)$ requiring HARQ-ACK feedback corresponding to each minimum HARQ timing in the uplink subframe n, wherein the P minimum HARQ timings are $K_1, K_2, \ldots, K_P$ respectively, $K_1 > K_2 > \ldots > K_P$; and P>1, and i=1, 2, ..., P, and
   wherein the transmitting, by the terminal in the uplink subframe n, the HARQ-ACK of the transmission data in the downlink subframe set S(n) or the downlink subframe set $\psi(n,Ki)$ comprises:
   determining a channel selection table, a HARQ-ACK codebook size of each serving cell, and a HARQ-ACK order used when the HARQ-ACK is sent in a Physical Uplink Control Channel (PUCCH);
   when the terminal is configured as HARQ-ACK multiplexing or PUCCH format 1b joint channel selection, a value of M in the channel selection table is determined according to the downlink subframe set S(n) or the downlink subframe set $\psi(n,K_i)$; a HARQ-ACK(i) in the channel selection table corresponding to a downlink subframe $n-k_i$, wherein $k_i \in S(n)$ is an element in the set S(n); and
   when the terminal is configured as a PUCCH format 3, a single codeword stream transmission mode or a double codeword stream transmission mode is configured and spatial binding is enabled, the HARQ-ACK codebook size L of each serving cell is equal to M; and when the double codeword stream transmission mode is configured and the spatial binding is not enabled, the HARQ-ACK codebook size L of each serving cell is equal to 2M.

2. The method for sending uplink control information according to claim 1, wherein the terminal determines the minimum HARQ timing used by the subframe according to the downlink control information.

3. The method for sending uplink control information according to claim 2, further comprising:
   when the minimum HARQ timing of the downlink subframe received by the terminal is $K_x$, while the minimum HARQ timing of the last downlink subframe received previously is $K_y$, and $K_x > K_y$, performing, by the terminal, a fallback operation of the minimum HARQ timing in the downlink subframe; wherein the downlink subframe has different HARQ timings when the minimum HARQ timings are $K_x$ and $K_y$, $K_x$, $K_y \in \{K_1, K_2, \ldots, K_P\}$.

4. The method for sending uplink control information according to claim 1, wherein for a Time Division Duplexing (TDD) system, the downlink subframe set $\psi(n,Ki)$ is determined according to at least one of the minimum HARQ timing, uplink and downlink configurations, and downlink-reference uplink and downlink configurations.

5. The method for sending uplink control information according to claim 1, wherein the downlink subframe set $\psi(n,K_i)$ is obtained according to Table 1, 2, 3, 4, 5 or 7:

TABLE 1

| Uplink and downlink configuration | Subframe n ($K_i$ = 4) | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 1-continued

| Uplink and downlink configuration | Subframe n ($K_i = 4$) | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 2

| Uplink and downlink configuration | Subframe n ($K_i = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 3, 7, 4, 6 | — | — | — | — | 3, 7, 4, 6 | — | — |
| 3 | — | — | 7, 6, 5 | 4, 5 | 3, 4 | — | — | — | — | — |
| 4 | — | — | 6, 8, 7, 11 | 6, 5, 4, 3 | — | — | — | — | — | — |
| 5 | — | — | 3, 12, 9, 8, 7, 5, 4, 11, 6 | — | — | — | — | — | — | — |
| 6 | — | — | 6 | 4 | 4 | — | — | 6 | 3 | — |

TABLE 4

| Uplink and downlink configuration | Subframe n ($K_i = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3- | — | — | — | 3 | 3 |
| 1 | — | — | 3, 6 | 3 | — | — | — | 3, 6 | 3 | — |
| 2 | — | — | 3, 7, 4, 6 | — | — | — | — | 3, 7, 4, 6 | — | — |
| 3 | — | — | 7, 6, 5, 4, 3 | 3 | 3 | — | — | — | — | — |
| 4 | — | — | 8, 7, 6, 5, 4, 3, 11 | 3 | — | — | — | — | — | — |
| 5 | — | — | 3, 12, 9, 8, 7, 5, 4, 11, 6 | — | — | — | — | — | — | — |
| 6 | — | — | 6, 3 | 3 | 3 | — | — | — | 3 | — |

TABLE 7

| Uplink and downlink configuration | Subframe n ($K_i = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 3, 7, 4, 6 | — | — | — | — | 3, 7, 4, 6 | — | — |
| 3 | — | — | 7, 6, 5 | 4, 5 | 3, 4 | — | — | — | — | — |
| 4 | — | — | 6, 8, 7, 11 | 6, 5, 4, 3 | — | — | — | — | — | — |
| 5 | — | — | 3, 12, 9, 8, 7, 5, 4, 11, 6 | — | — | — | — | — | — | — |
| 6 | — | — | 6, 3 | 3 | 3 | — | — | — | 3 | — |

TABLE 3

| Uplink and downlink configuration | Subframe n ($K_i = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |

TABLE 3-continued

| Uplink and downlink configuration | Subframe n ($K_i = 2$) | | | | | | | | | |
|---|---|---|---|---|---|---|---|---|---|---|
| | 0 | 1 | 2 | 3 | 4 | 5 | 6 | 7 | 8 | 9 |
| 2 | — | — | 3, 2, 4, 6 | — | — | — | — | 3, 2, 4, 6 | — | — |
| 3 | — | — | 7, 6, 5 | 4, 5 | 3, 4 | — | — | — | — | — |
| 4 | — | — | 5, 8, 7, 6 | 3, 5, 4, 2 | — | — | — | — | — | — |
| 5 | — | — | 3, 2, 9, 8, 7, 5, 4, 11, 6 | — | — | — | — | — | — | — |
| 6 | — | — | 3 | 3 | 3 | — | — | 2 | 2 | — |

TABLE 5

| Uplink and downlink configuration | Subframe n ($K_i = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |
| 2 | — | — | 3, 2, 4, 6 | — | — | — | — | 3, 2, 4, 6 | — | — |
| 3 | — | — | 7, 6, 5, 4, 3, 2 | 2 | — | — | — | — | — | — |
| 4 | — | — | 8, 7, 6, 5, 4, 3, 2 | 2 | — | — | — | — | — | — |
| 5 | — | — | 3, 2, 9, 8, 7, 5, 4, 11, 6 | — | — | — | — | — | — | — |
| 6 | — | — | 3, 2 | 2 | — | — | — | 2 | 2 | — |

6. The method for sending uplink control information according to claim 1, wherein elements in the downlink subframe set S(n) are sorted according to an order of $\psi(n,K_1), \psi(n,K_2), \ldots, \psi(n,K_P)$; and for the same elements contained in two or more than two sets $\psi(n,K_1), \psi(n,K_2), \ldots, \psi(n,K_P)$, the set S(n) only contains the element that appears for the first time.

7. The method for sending uplink control information according to claim 5, wherein the downlink subframe set S(n) is contained in Table 8, 9, 10, 11 or 12;

TABLE 8

| Uplink and downlink configuration | Subframe n ($K_1 = 4, K_2 = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 4, 3 | — | — | 6 | 3 | 4, 3 |
| 1 | — | — | 7, 6, 3 | 4, 3 | — | — | — | 7, 6, 3 | 4, 3 | — |
| 2 | — | — | 8, 7, 4, 6, 3 | — | — | — | — | 8, 7, 4, 6, 3 | — | — |
| 3 | — | — | 7, 6, 11, 5 | 6, 5, 4 | 5, 4, 3 | — | — | — | — | — |
| 4 | — | — | 12, 8, 7, 11, 6 | 7, 6, 5, 4, 3 | — | — | — | — | — | — |
| 5 | — | — | 13, 12, 9, 8, 7, 5, 4, 11, 6, 3, | — | — | — | — | — | — | — |
| 6 | — | — | 7, 6 | 7, 4 | 5, 4 | — | — | 7, 6 | 7, 3 | — |

TABLE 9

| Uplink and downlink configuration | Subframe n ($K_1 = 4, K_2 = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 4, 3 | — | — | 6 | 3 | 4, 3 |
| 1 | — | — | 7, 6, 3 | 4, 3 | — | — | — | 7, 6, 3 | 4, 3 | — |
| 2 | — | — | 8, 7, 4, 6, 3 | — | — | — | — | 8, 7, 4, 6, 3 | — | — |
| 3 | — | — | 7, 6, 11, 5, 4, 3 | 6, 5, 3 | 5, 4, 3 | — | — | — | — | — |

TABLE 9-continued

| Uplink and downlink configuration | Subframe n ($K_1 = 4$, $K_2 = 3$) | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11, 6, 5, 4, 3, | 7, 6, 5, 4, 3 | — | — | — | — | — | — |
| 5 | — | — | 13, 12, 9, 8, 7, 5, 4, 11, 6, 3, | — | — | — | — | — | — | — |
| 6 | — | — | 7, 6, 3 | 7, 3 | 5, 3 | — | — | 7 | 7, 3 | — |

TABLE 10

| Uplink and downlink configuration | Subframe n ($K_1 = 4$, $K_2 = 3$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 4, 3 | — | — | 6 | 3 | 4, 3 |
| 1 | — | — | 7, 6, 3 | 4, 3 | — | — | — | 7, 6, 3 | 4, 3 | — |
| 2 | — | — | 8, 7, 4, 6, 3 | — | — | — | — | 8, 7, 4, 6, 3 | — | — |
| 3 | — | — | 7, 6, 11, 5 | 6, 5, 4 | 5, 4, 3 | — | — | — | — | — |
| 4 | — | — | 12, 8, 7, 11, 6 | 7, 6, 5, 4, 3 | — | — | — | — | — | — |
| 5 | — | — | 13, 12, 9, 8, 7, 5, 4, 11, 6, 3, | — | — | — | — | — | — | — |
| 6 | — | — | 7, 6, 3 | 7, 3 | 5, 3 | — | — | 7 | 7, 3 | — |

TABLE 11

| Uplink and downlink configuration | Subframe n ($K_1 = 4$, $K_2 = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 2 | 2 | 4 | — | — | 6, 2 | 2 | 4 |
| 1 | — | — | 7, 6, 3, 2, | 4, 2 | — | — | — | 7, 6, 3, 2, | 4, 2 | — |
| 2 | — | — | 8, 7, 4, 6, 3, 2, | — | — | — | — | 8, 7, 4, 6, 3, 2, | — | — |
| 3 | — | — | 7, 6, 11, 5, | 6, 5, 4 | 5, 4, 3 | — | — | — | — | — |
| 4 | — | — | 12, 8, 7, 11, , 6, 5, | 7, 6, 5, 4, 3, 2 | — | — | — | — | — | — |
| 5 | — | — | 13, 12, 9, 8, 7, 5, 4, 11, 6, 3, 2 | — | — | — | — | — | — | — |
| 6 | — | — | 7, 3 | 7, 3 | 5, 3 | — | — | 7, 2 | 7, 2 | — |

TABLE 12

| Uplink and downlink configuration | Subframe n ($K_1 = 4$, $K_2 = 2$) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 2 | 2 | 4 | — | — | 6, 2 | 2 | 4 |
| 1 | — | — | 7, 6, 3, 2 | 4, 2 | — | — | — | 7, 6, 3, 2 | 4, 2 | — |
| 2 | — | — | 8, 7, 4, 6, 3, 2 | — | — | — | — | 8, 7, 4, 6, 3, 2 | — | — |
| 3 | — | — | 7, 6, 11, 5, 4, 3, 2, | 6, 5, 2 | 5, 4 | — | — | — | — | — |

TABLE 12-continued

| Uplink and downlink configuration | Subframe n (K$_1$ = 4, K$_2$ = 2) | | | | | | | | |
|---|---|---|---|---|---|---|---|---|---|
| | 0 | 1 | 2 | 3 | 4 | 5 | 6 | 7 | 8 | 9 |
| 4 | — | — | 12, 8, 7, 11, 6, 5, 4, 3, 2 | 7, 6, 5, 4, 2 | — | — | — | — | — | — |
| 5 | — | — | 13, 12, 9, 8, 7, 5, 4, 11, 6, 3, 2 | — | — | — | — | — | — | — |
| 6 | — | — | 7, 3, 2 | 7, 2 | 5 | — | — | 7, 2 | 7, 2 | —. |

8. The method for sending uplink control information according to claim 1, wherein an element $a_i$ or $a_{2i}, a_{2i+1}$ in an HARQ-ACK bit sequence of each serving cell sent in the PUCCH format 3 is corresponding to a subframe n-k$_i$ or a HARQ-ACK of two codeword streams of the subframe n-k$_i$; or, the subframe n-k$_i$; or the HARQ-ACK of two codeword streams of the subframe n-k$_i$ is corresponding to a bit sequence element $a_{DAI(ki)-1}$ or $a_{2DAI(ki)-2}, a_{2DAI(ki)-1}$, wherein DAI(k$_i$) is a Downlink Assignment Indicator (DAI) value in Downlink Control Information (DCI) sent by the subframe n-k$_i$.

9. The method for sending uplink control information according to claim 8, wherein when the HARQ-ACK bit sequence is sorted based on DAI, a DAI value thereof is determined according to a HARQ-ACK timing of a currently scheduled subframe when performing downlink scheduling, and subframe accumulation is performed on DAI values of downlink subframes performing HARQ-ACK feedback in the same uplink subframe.

10. The method for sending uplink control information according to claim 1, wherein the transmitting, by the terminal in the uplink subframe n, the HARQ-ACK of the transmission data in the downlink subframe set ψ(n,K$_i$) comprises:

for a FDD system, when the terminal receives scheduling with a minimum timing K$_a$ in a downlink subframe m, not sending, by the terminal, a HARQ-ACK corresponding to the scheduling when the terminal receives scheduling with a HARQ minimum timing K$_b$ in (K$_a$-K$_b$) subframes after the downlink subframe m, wherein K$_b$<K$_a$, Ka, K$_b$∈{K$_1$, K$_2$, . . . , K$_P$}; and sending a HARQ-ACK of the downlink subframe m in the uplink subframe n, wherein m is an integer different from n, and greater than or equal to 0.

11. A terminal, comprising a processor for data processing, a memory for data storage, and a data transceiver for data transmitting and receiving, wherein the memory is stored with computer-executable instructions for executing:

determining a downlink subframe set S(n) corresponding to P minimum HARQ timings, wherein S(n) is a union set of all downlink subframe sets ψ(n,K$_i$), P is an integer greater than 1, n is an integer greater than or equal to 0, K$_i$ is an integer greater than 0, but less than or equal to 4, and i is an integer greater than or equal to 1, but less than or equal to P; and sending, by the terminal in an uplink subframe n, a Hybrid Automatic Repeat reQuestACKnowledgement (HARQ-ACK) corresponding to transmission data in the downlink subframe set S(n) or the downlink subframe set ψ(n,K$_i$), wherein the computer-executable instructions are used for executing:

when performing HARQ-ACK feedback in the uplink subframe n, determining the downlink subframe set ψ(n,K$_i$) requiring HARQ-ACK feedback corresponding to each minimum HARQ timing in the uplink subframe n, wherein the P minimum HARQ timings are K$_1$, K$_2$, . . . , KP respectively, K1>K2> . . . >KP; and P>1, and i=1, 2, . . . , P, and wherein the computer-executable instructions are used for executing:

determining a channel selection table, or a HARQ-ACK codebook size, and a HARQ-ACK order used when the HARQ-ACK is sent in a Physical Uplink Control Channel (PUCCH);

determining a value of M in the channel selection table according to the downlink subframe set S(n) or the downlink subframe set ψ(n,K$_i$) when the terminal is configured as HARQ-ACK multiplexing or PUCCH format 1b joint channel selection; a HARQ-ACK(i) in the channel selection table corresponding to a downlink subframe n-k$_i$, wherein k$_i$∈S(n) or ψ(n,K$_i$) is an element in the set S(n) or ψ(n,K$_i$); and when the terminal is configured as a PUCCH format 3, a single codeword stream transmission mode or a double codeword stream transmission mode is configured and spatial binding is enabled, the HARQ-ACK codebook size L of each serving cell is equal to M; and when the double codeword stream transmission mode is configured and the spatial binding is not enabled, the HARQ-ACK codebook size L of each serving cell is equal to 2M.

12. The terminal according to claim 11, wherein the computer-executable instructions are used for executing: determining the minimum HARQ timing used by the subframe according to the downlink control information.

13. The terminal according to claim 11, wherein the computer-executable instructions are used for executing: for a Time Division Duplexing TDD system, determining the downlink subframe set ψ(n,K$_i$) according to at least one of the minimum HARQ timing, uplink and downlink configurations, and downlink-reference uplink and downlink configurations.

14. The terminal according to claim 11, wherein:

an element $a_i$ or $a_{2i}, a_{2i+1}$ in an HARQ-ACK bit sequence of each serving cell sent in the PUCCH format 3 is corresponding to a subframe n-k$_i$ or a HARQ-ACK of two codeword streams of the subframe n-k$_i$; or, the subframe n-k$_i$ or the HARQ-ACK of two codeword streams of the subframe n-k$_i$ is corresponding to a bit sequence element $a_{DAI(ki)-1}$ or $a_{2DAI(ki)-2}, a_{2DAI(ki)-1}$, wherein $DAI(k_i)$ is a DAI value in Downlink DCI sent by the subframe $n-k_i$.

15. The terminal according to claim 11, wherein the processing module is configured to:
for a FDD system, when the terminal receives scheduling with a minimum timing $K_a$ in a downlink subframe m, not sending a HARQ-ACK corresponding to the scheduling when the terminal receives scheduling with a HARQ minimum timing $K_b$ in $(K_a-K_b)$ subframes after the downlink subframe m, wherein $K_b<K_a$, $K_a, K_b \in \{K_1, K_2, \ldots, K_P\}$; and sending a HARQ-ACK of the downlink subframe m in the uplink subframe n.

\* \* \* \* \*

UNITED STATES PATENT AND TRADEMARK OFFICE
CERTIFICATE OF CORRECTION

PATENT NO. : 11,303,395 B2
APPLICATION NO. : 16/338439
DATED : April 12, 2022
INVENTOR(S) : Chunli Liang et al.

It is certified that error appears in the above-identified patent and that said Letters Patent is hereby corrected as shown below:

In the Specification

Column 4, Line 63, the parameter reading - $\Psi(n,K_i)$ - should read -- $\Psi(n,K_1)$ --

Column 14, Line 4, the parameter reading - $K_i$ - should read -- $K_1$ --

Column 14, Line 9, the parameter reading - $\Psi(n,K))$ - should read -- $\Psi(n,K_1)$ --

Column 14, Line 18, the parameter reading - $\Psi(n,K_i)$ - should read -- $\Psi(n,K_1)$ --

Column 14, Line 32, the parameter reading - $\Psi(n,K_1)$ - should read -- $\Psi(n,K_2)$ --

Column 18, Line 67, the parameter reading - $\Psi(n,K_i)$ - should read -- $\Psi(n,K_1)$ --

Column 25, Line 34, the parameter reading - $\Psi(n,K_i)$ - should read -- $\Psi(n,K_1)$ --

Column 25, Line 36, the parameter reading - $\Psi(n,K_i)$ - should read -- $\Psi(n,K_1)$ --

In the Claims

Column 44, Line 62, the parameter reading - $a_{2+1}$ - should read -- $a_{2i+1}$ --

Signed and Sealed this
Sixteenth Day of May, 2023

Katherine Kelly Vidal
*Director of the United States Patent and Trademark Office*